Figure 1:
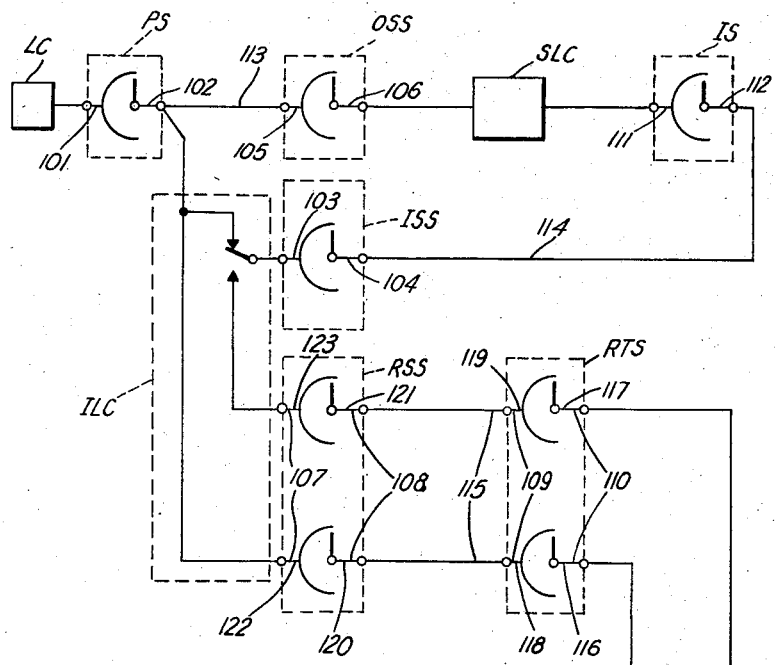

July 22, 1958   J. E. FLOOD   2,844,653
AUTOMATIC EXCHANGE SYSTEMS
Filed June 2, 1954   13 Sheets-Sheet 1

Inventor
JOHN EDWARD FLOOD
By H.S. Hendry
Attorney

July 22, 1958  J. E. FLOOD  2,844,653
AUTOMATIC EXCHANGE SYSTEMS
Filed June 2, 1954  13 Sheets-Sheet 2

Inventor
JOHN EDWARD FLOOD
By H.S. Hendry
Attorney

July 22, 1958

J. E. FLOOD 2,844,653

AUTOMATIC EXCHANGE SYSTEMS

Filed June 2, 1954

13 Sheets-Sheet 4

Inventor

JOHN EDWARD FLOOD

By *H. S. Hendry*

Attorney

July 22, 1958  J. E. FLOOD  2,844,653
AUTOMATIC EXCHANGE SYSTEMS
Filed June 2, 1954  13 Sheets-Sheet 5
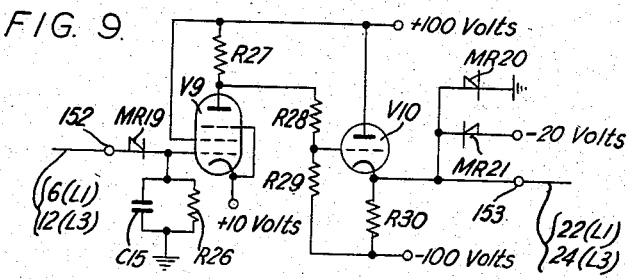
FIG. 9.
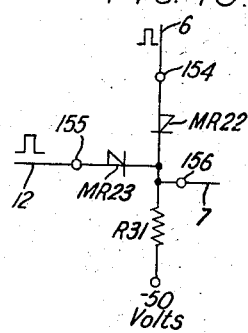
FIG. 10.
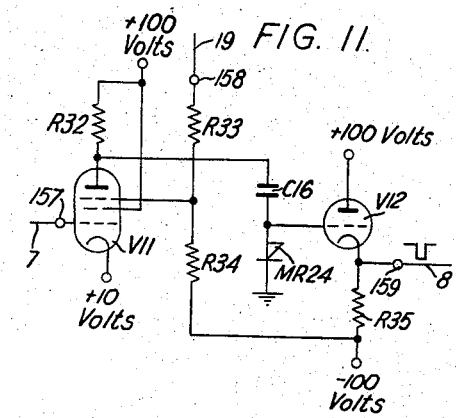
FIG. 11.
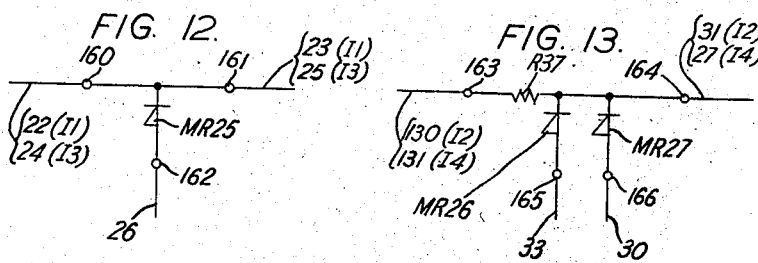
FIG. 12.
FIG. 13.
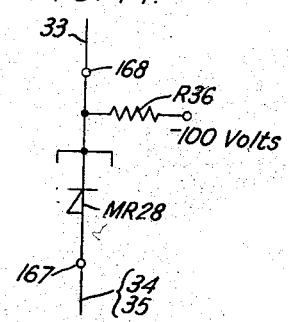
FIG. 14.
Inventor
JOHN EDWARD FLOOD
By H.S. Hendry
Attorney

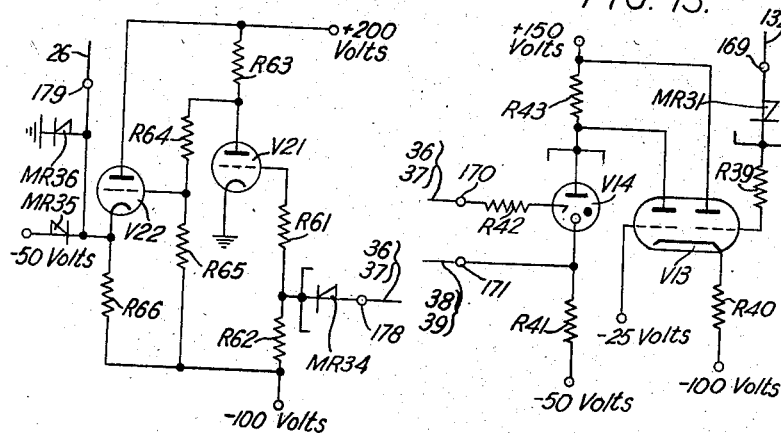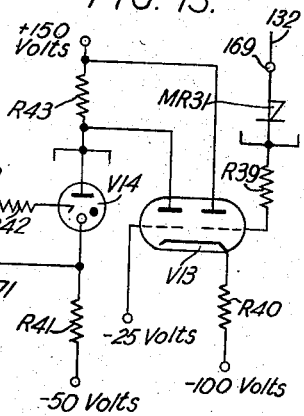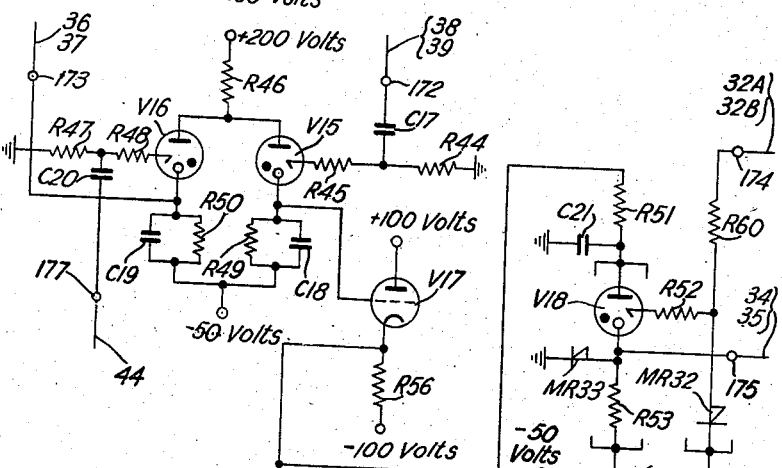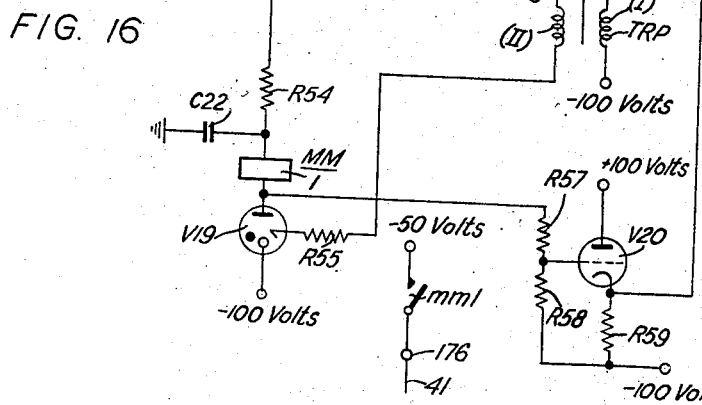

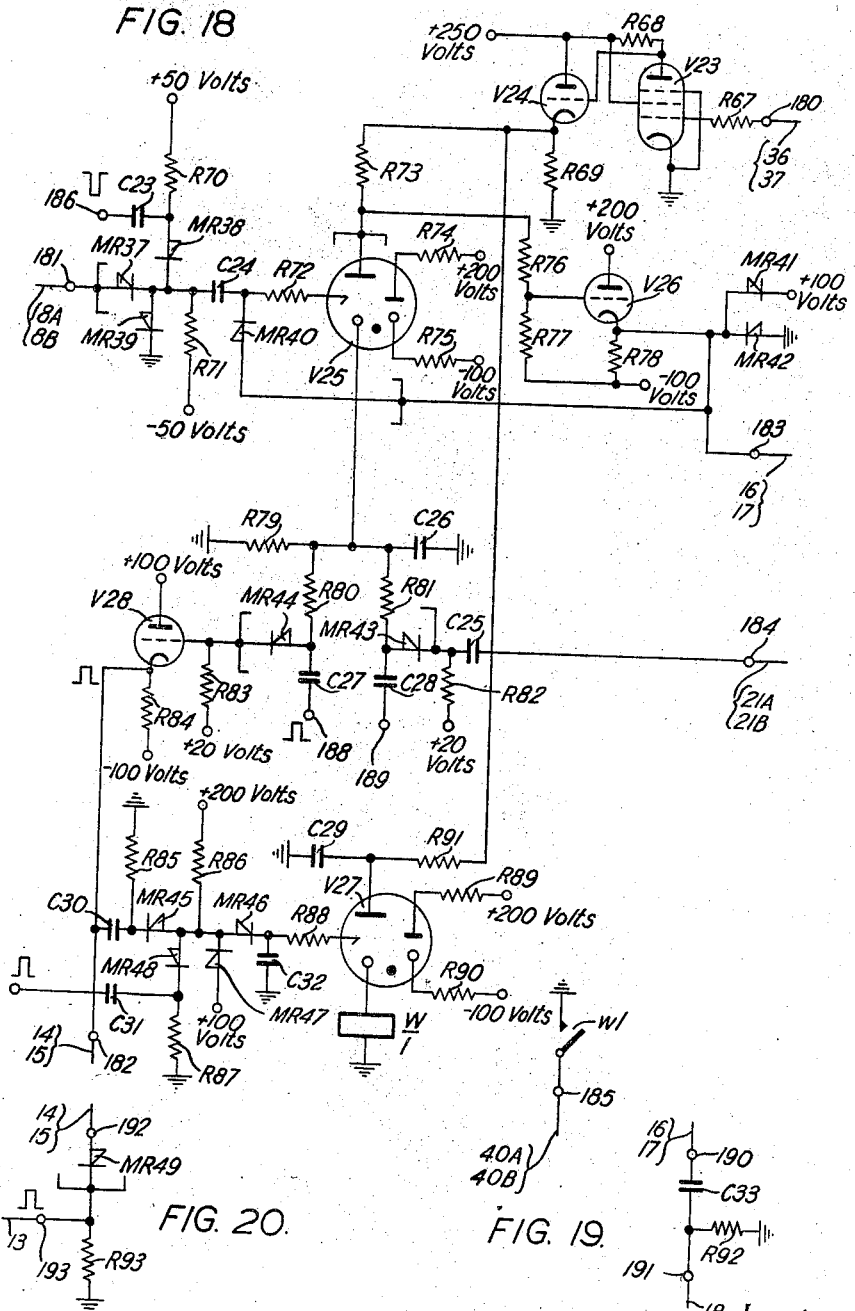

July 22, 1958
J. E. FLOOD
2,844,653
AUTOMATIC EXCHANGE SYSTEMS
Filed June 2, 1954
13 Sheets-Sheet 8
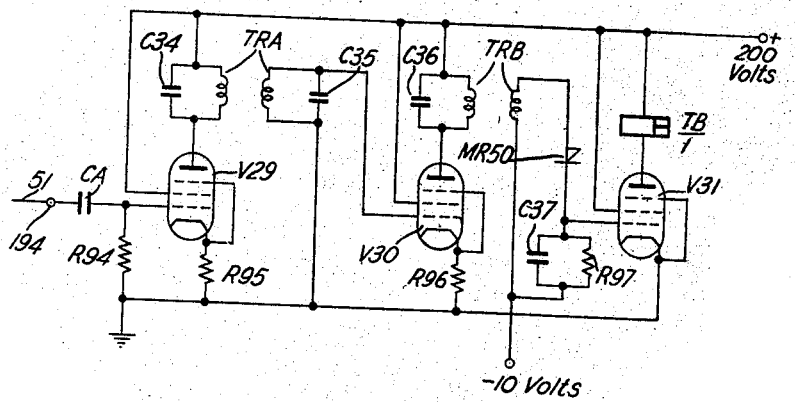
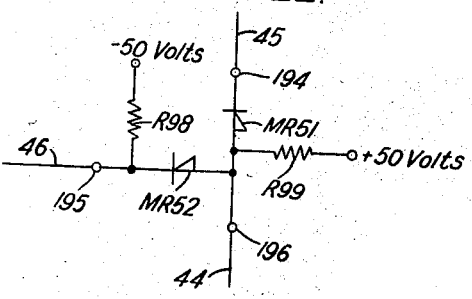
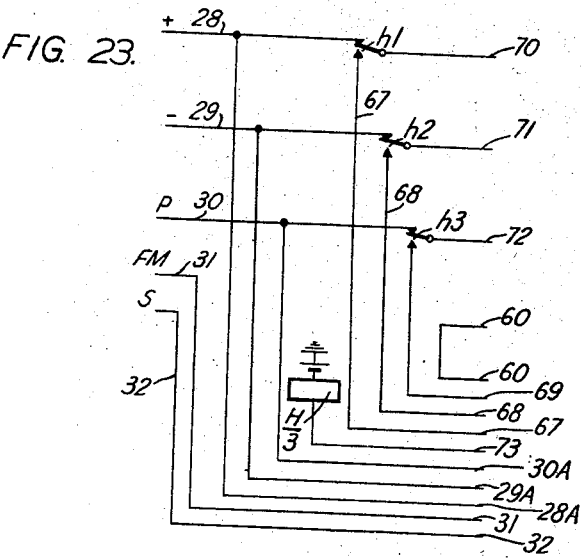
Inventor
JOHN EDWARD FLOOD
By H.S. Hendry
Attorney Inventor
JOHN EDWARD FLOOD
By
Attorney July 22, 1958
J. E. FLOOD
2,844,653
AUTOMATIC EXCHANGE SYSTEMS
Filed June 2, 1954
13 Sheets-Sheet 13
FIG. 28.
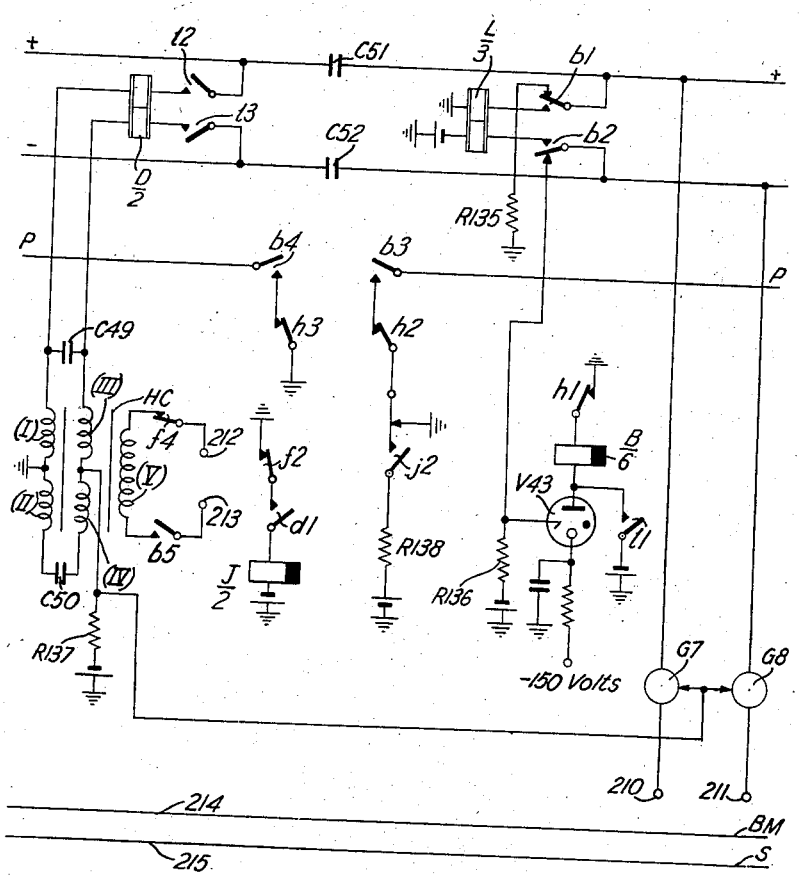
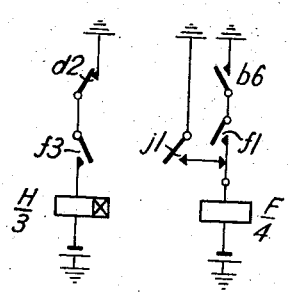
Inventor
JOHN EDWARD FLOOD
By H.S. Hendry
Attorney

United States Patent Office 2,844,653
Patented July 22, 1958

2,844,653

AUTOMATIC EXCHANGE SYSTEMS

John Edward Flood, London, England, assignor to Siemens Edison Swan Limited, a British company Application June 2, 1954, Serial No. 434,008

10 Claims. (Cl. 179—18)

This invention relates to automatic exchange systems such as automatic telephone exchange systems.

For many years, automatic telephone exchange systems have been known in which a so-called marker in effect serves a plurality of selectors comprising selectors in each of a plurality of consecutive ranks, it being arranged that the marker, by marking a called circuit to which these selectors afford access, causes a train of these selectors, comprising one selector in each rank, to be set to constitute a through connection connecting the called circuit to or towards the relevant calling circuit.

Hitherto, ignoring any provision of spare markers, it has been usual, in automatic exchange systems in which the marking of a called circuit by a marker in effect controls the setting of a train of selectors, to arrange that only the one marker serves the plurality of selectors with which a marker is associated and that only one through connection can be in process of being set up over selectors of such a plurality at a time, so that the connection of the calling circuit of one call to the called circuit of another call is avoided without complication. The limitation involved in this hitherto usual arrangement, that only one through connection can be in process of being set up at a time over the plurality of selectors associated with a marker and comprising selectors in a plurality of consecutive ranks, has operated in the past to impose a limit on the size of the group of line or like circuits associated with a marker, and to restrict the general application of the method of operation concerned to systems employing selectors of the relay or cross-bar type.

Advantageous trunking arrangements are rendered possible, in the case of an automatic exchange having a line capacity large enough to require the provision of a plurality of ranks of selectors arranged to be set in accordance with called number signals, if the exchange is so constituted that all such selectors constitute the plurality of selectors with which a marker is associated and are arranged to be set in response to a marking applied by this marker. Accordingly, proposals have been made either to avoid, or to reduce the effect of, the limitation that only one through connection can be in process of being set up at a time over the plurality of selectors associated with a marker and comprising selectors in a plurality of consecutive ranks. It has been proposed greatly to reduce the effect of the limitation by making use of the fact that the time taken to set a fully electronic selector is very small indeed in comparison with the time taken to effect a corresponding setting of an equivalent electro-mechanical selector, and by employing fully electronic selectors as the selectors constituting the plurality associated with a marker. A large (e. g. 10,000-line) single-marker exchange employing fully electronic selectors as the selectors constituting the plurality associated with the marker has been envisaged.

The present invention in one aspect has in view the provision of an improved automatic exchange system in which, although the selectors constituting the plurality associated with a marker and comprising selectors in a plurality of consecutive ranks are of an electro-mechanical nature, no limit of practical importance is imposed on the size of the group of line or like circuits associated with the marker, by reason of the times taken to set up through connections over trains of these selectors.

In another aspect, the present invention has in view the provision of an improved single-marker exchange employing electro-mechanical selectors. Such an exchange may be a large (e. g. 10,000-line) one.

In yet another aspect, the present invention has in view the provision of improved arrangements, employing two or more ranks of electro-mechanical selectors, for extending a connection forwards from a calling line (e. g. to a register).

As at present foreseen, the invention in its various aspects is directed to cases where the selectors concerned are electro-mechanical selectors, but it is possible that some of the features of the invention may find applications in a wider field, and such applications are not excluded from the scope of the invention. The invention is especially directed to cases where the selectors concerned are high-speed motor-driven uniselectors.

According to one main feature of the invention, there is provided an automatic exchange system wherein selectors (e. g. uniselectors) are arranged to constitute one or more groups of selectors in each of two or more ranks, wherein each of said groups has a common control circuit associated with it, and wherein an available path, for connecting a called circuit to or towards the relevant calling circuit and involving one selector in each rank and backward-marked as the result of the marking of the called circuit by a marker, is appropriated for the call concerned, as regards each selector involved, by electronic equipment in or associated with the common control circuit associated with the group to which the selector belongs, such electronic equipment being arranged to record the identities of the two terminal trunks associated with the selector which are included in said available path and to control the setting of the selector to effect a through connection between these particular terminal trunks, and the marker being rendered available for use on another call as soon as the electronic storage circuits concerned have recorded the identities of all the relevant terminal trunks included in said available path.

According to another main feature of the invention, there is provided an automatic exchange system wherein selectors (e. g. uniselectors) are arranged to constitute one or more groups of selectors in each of two or more ranks, wherein each of said groups has a common control circuit associated with it, and wherein an available path, for extending a connection forwards from a calling circuit (e. g. from a calling line to a register) and involving one selector in each rank and forward-marked as the result of the calling condition of the calling circuit, is appropriated for the call concerned, as regards each selector involved, by electronic equipment in or associated with the common control circuit associated with the group to which the selector belongs, such electronic equipment being arranged to record the identities of the two terminal trunks associated with the selector which are included in said available path and to control the setting of the selector to effect a through connection between these particular terminal trunks, and the forward-marking in respect of the calling circuit being terminated as soon as the electronic storage circuits concerned have recorded the identities of all the relevant terminal trunks included in said available path.

According to yet another main feature of the invention, there is provided an automatic exchange system wherein a group of selectors (e. g. uniselectors) has associated with it a common control circuit arranged so that the reception, as a consequence of the extension of a marking condition from a terminal trunk or trunks pertaining to one side (e. g. the bank side) of the group to each free terminal trunk pertaining to the other side (e. g. the wiper side) of the group, of a setting-initiating condition over a particular terminal trunk pertaining to said other side, causes a free master selector circuit in or associated with the common control circuit to be taken into use for the call concerned, and causes electronic storage equipment in this master selector circuit to be set to record over which particular terminal trunk pertaining to said other side the setting-initiating condition has been received and to which marked terminal trunk pertaining to said one side this particular terminal trunk pertaining to said other side is to be connected by the relevant selector of the group.

According to a further feature of the invention, there is provided an automatic exchange system wherein a group of selectors (e. g. uniselectors) has associated with it a common control circuit including a time-division-multiplex system the channels of which are allocated individually, for selection controlling purposes, to the terminal trunks pertaining to one side (e. g. the bank side or the wiper side) of the group, wherein the appearance of a marking condition on a free terminal trunk pertaining to the said side produces a corresponding pulse train in a pulse highway of the time-division-multiplex system, and wherein the appropriation of a free and marked terminal trunk pertaining to the said side for a call is effected by the response of an electronic storage circuit, included in a master selector circuit in or associated with the common control circuit, to a pulse present on said pulse highway subsequent to the reception by this electronic storage circuit of an intimation that selection is to be effected, such response causing the electronic storage circuit to apply a further marking to the terminal trunk corresponding to that channel of the time-division-multiplex system to which the said pulse belongs.

According to a still further feature of the invention, there is provided a line circuit wherein a line wire is conductively connected to a marking wire connected to a common control circuit, the change of potential of the said line wire resulting from the closing of a calling loop causing the potential of the said marking wire to change from a normal value to a value constituting a marking condition indicating the calling condition of the line, and wherein an electronic means is provided for holding the potential of the said marking wire at a value not constituting a marking condition upon its being determined that the calling condition of the line is a permanent loop or kindred condition.

Figure 2:
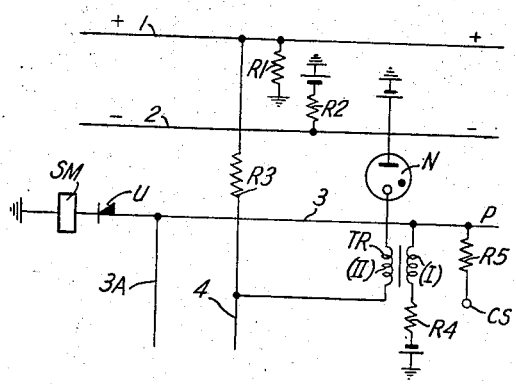
Figure 3A:
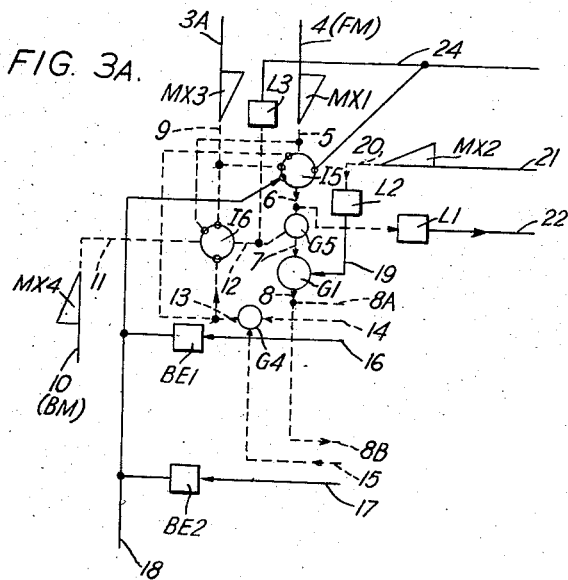
Figure 3B:
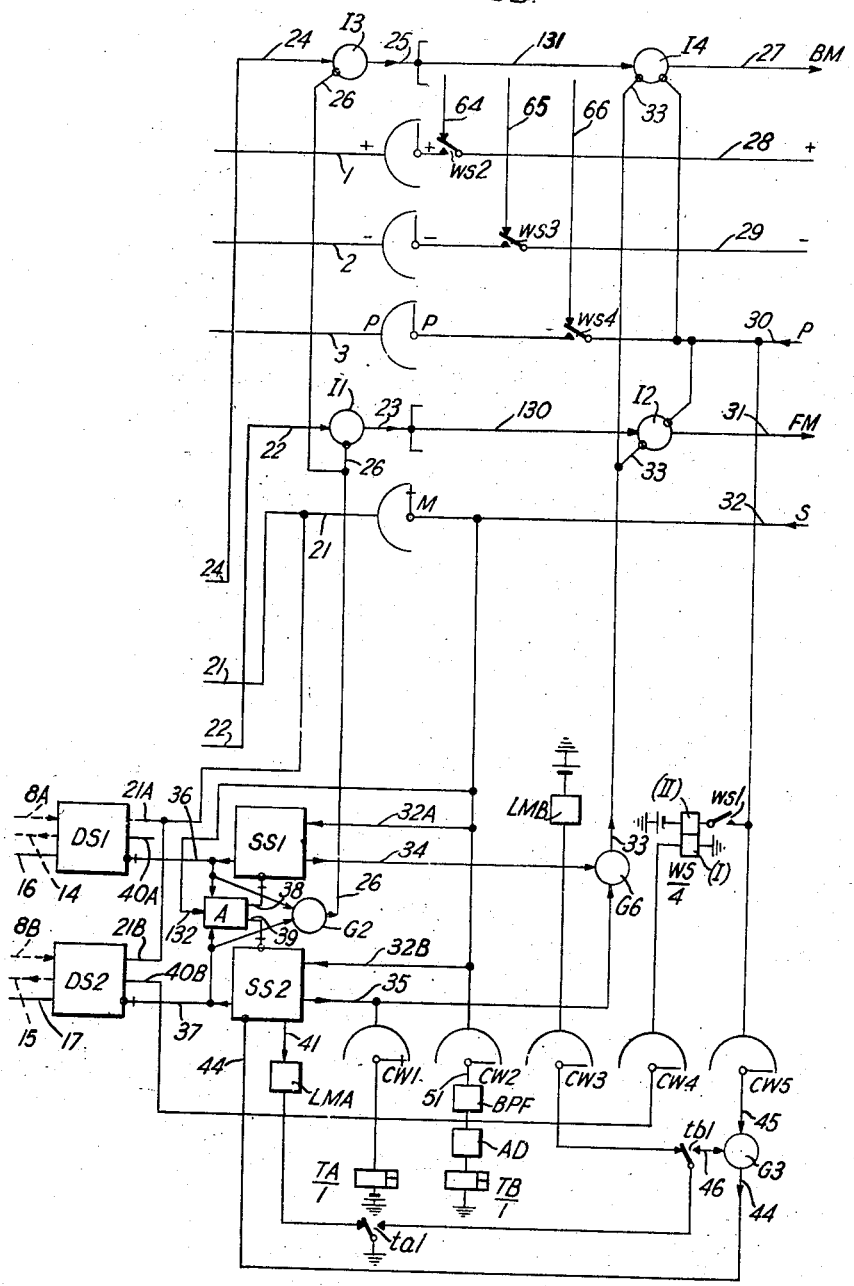
Figure 24:
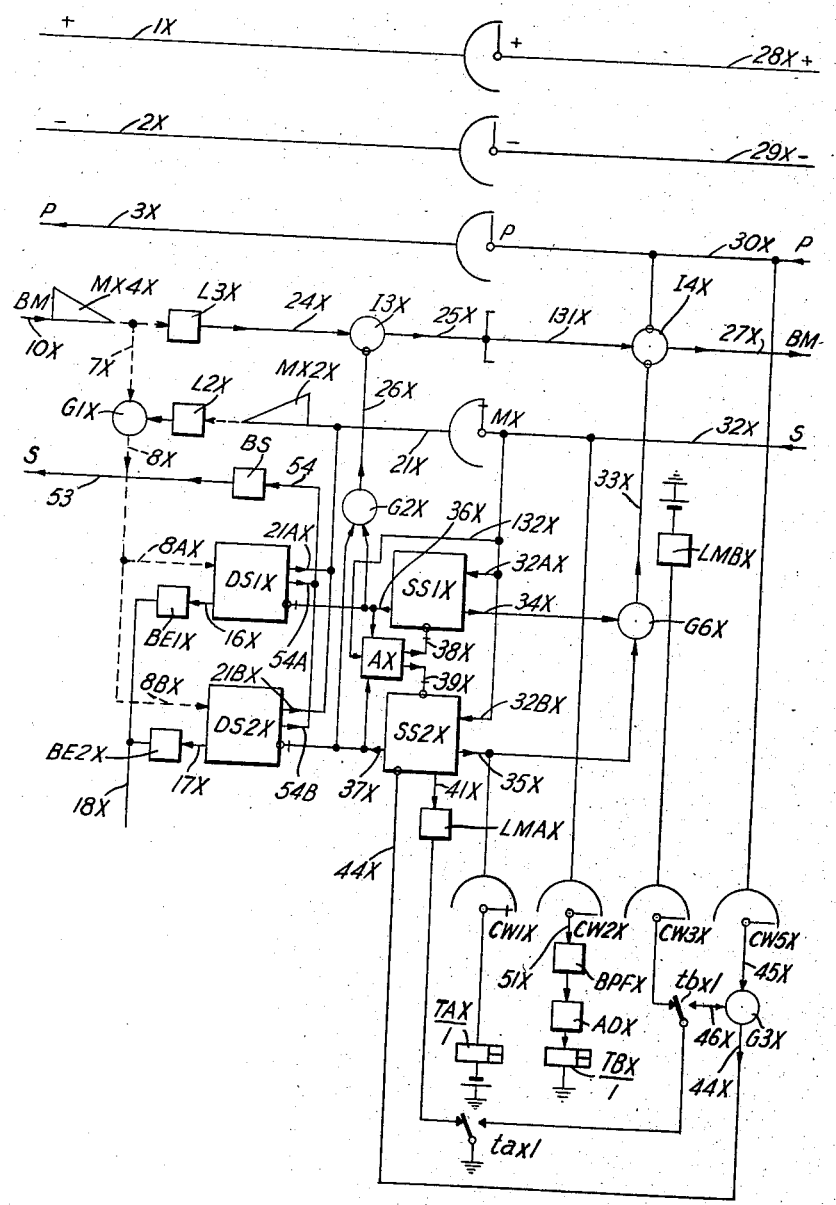
Figure 25:
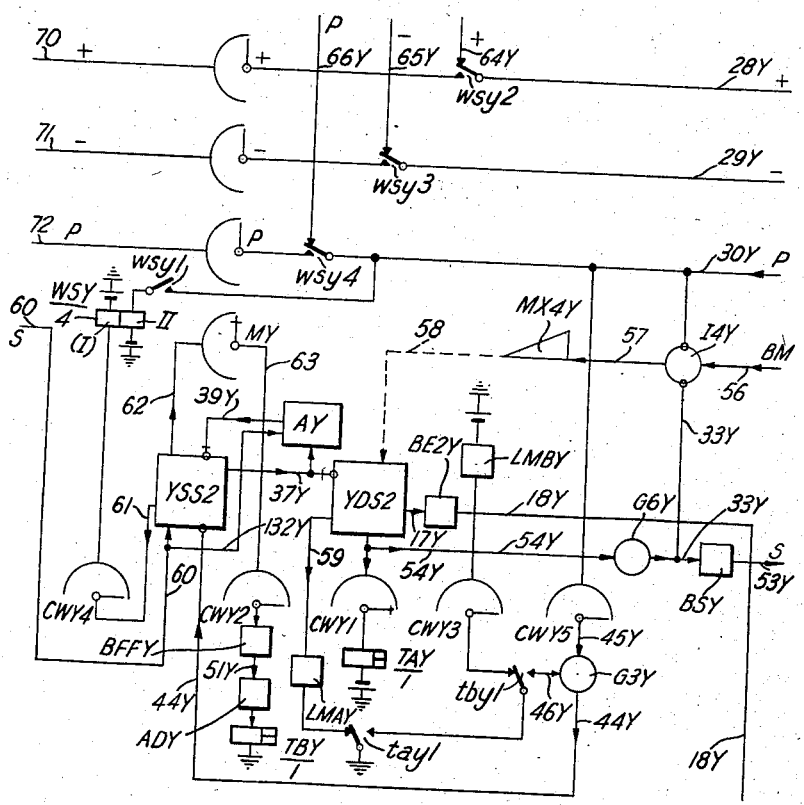
Figure 26:
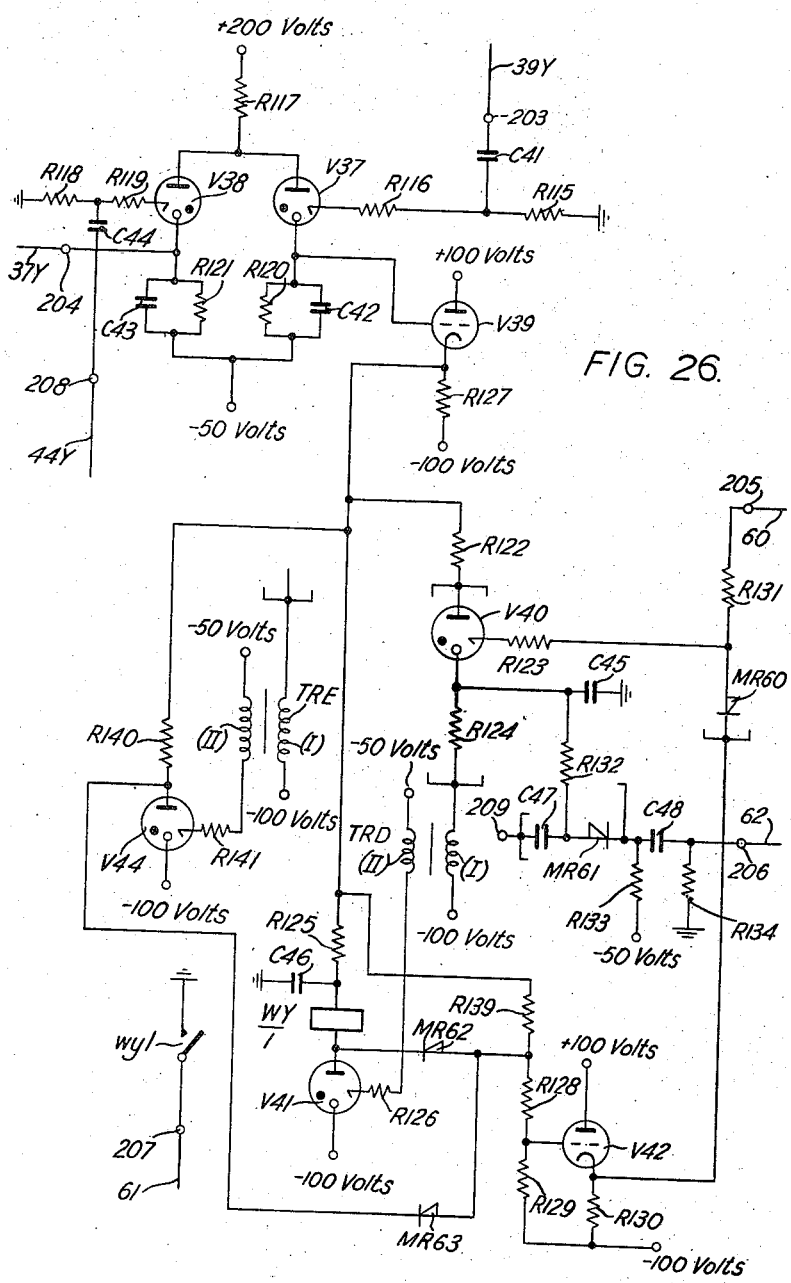
Figure 27:
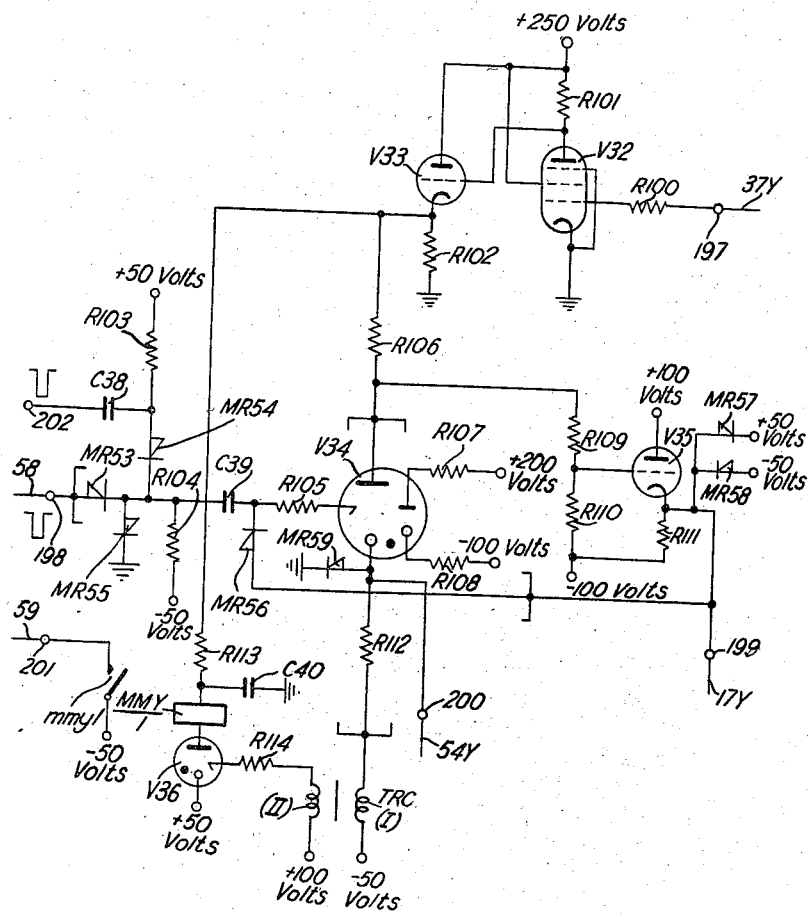

The features of the invention are exemplified in the specific selecting and related arrangements for a large (e. g. 10,000-line) automatic telephone exchange which will now be described with reference to the accompanying drawings. Fig. 1 of the drawings shows a schematic trunking diagram of the selecting and related arrangements concerned. Fig. 2 shows the line circuit of a line connected to the exchange. Figs. 3A and 3B together show the individual circuit of a primary selector and the common control circuit of a group of such selectors, and Figs. 4 to 22 inclusive show the forms which various elements of the circuit arrangements shown in Figs. 3A and 3B may take. Fig. 23 shows an incoming link circuit. Fig. 24 shows the individual circuit of an intermediate selector and the common control circuit of a group of such selectors. Fig. 25 shows the individual circuit of an incoming secondary selector and the common control circuit of a group of such selectors, and Figs. 26 and 27 show the forms which two elements of the circuit arrangements shown in Fig. 25 may take. Fig. 28 shows a supervisory link circuit.

The selecting and related arrangements concerned include groups of primary selectors, groups of incoming secondary selectors, groups of outgoing secondary selectors, groups of register secondary selectors, one or more groups of register tertiary selectors, and groups of intermediate selectors. All the selectors referred to are similar high-speed motor-driven uniselectors. Each has no normal position and has an individual driving electromotor the circuit of which is controlled in the well-known manner by a latch electromagnet. Each bank contact of a selector is multipled to the corresponding bank contacts of the other selectors of the group to which the selector belongs, so that a group bank multiple is constituted. The wires of each such group bank multiple are directly connected to wires of, or are otherwise associated with, the common-to-group or bank-side terminal trunks of the group of selectors concerned. The wipers of a selector are directly connected to wires of, or are otherwise associated with, a single individual-to-selector or wiper-side terminal trunk of the selector.

Referring now to Fig. 1, this as has already been stated shows a schematic trunking diagram of the selecting and related arrangements concerned. In this diagram, PS represents any primary selector, ISS represents any incoming secondary selector, OSS represents any outgoing secondary selector, RSS represents any register secondary selector, RTS represents any register tertiary selector, and IS represents any intermediate selector. The wiper-side terminal trunks of these selectors are represented at 102, 104, 106, 108, 110, and 112 respectively, whilst 101, 103, 105, 107, 109, and 111 represent bank-side terminal trunks associated with the respective selectors. In addition to the groups of selectors referred to, the selecting and related arrangements concerned also include line circuits, incoming link circuits, and supervisory link circuits, and are for use in conjunction with a plurality of registers and a single common marker. The constitution and organisation of the registers and of the common marker and of an allotter common to all the registers may be on known lines and do not form part of the present invention. In the trunking diagram, LC represents any line circuit, ILC represents any incoming link circuit, and SLC represents any supervisory link circuit. To make the diagram complete and facilitate description, representations of a register and of the common marker are included, RG representing any register and MK representing the common marker. Since each of the terminal trunks associated with the register secondary selectors and the register tertiary selectors includes both an incoming set of line and private wires and an outgoing set of line and private wires, and each such selector when set has to provide through connections in respect of two such sets of wires, these trunks and selectors are represented in the trunking diagram as being made up of two sections. The uniselectors employed are such as to provide for 100 bank-side terminal trunks per group of register secondary selectors or register tertiary selectors, and 200 bank-side terminal trunks per group in the case of other selectors. Each group of selectors has a common control circuit which either includes a number of master selector circuits or has a number of such circuits available to it. The bank-side terminal trunks 101 of each group of primary selectors PS are connected to the line circuits LC constituting a corresponding group of line circuits. Each primary selector PS serves, depending upon the circumstances in which it is taken into use, either as a backward-hunting selector which hunts for a calling line or as a forward-hunting selector which hunts for a called line. The wiper-side terminal trunk 102 of each primary selector PS is connected by an inter-stage trunk 113 to a bank-side terminal trunk 105 of a group of outgoing secondary selectors OSS, and is also connected to the inlet of an incoming link circuit ILC which includes a switching relay (represented in the figure by a single change-over contact). This link circuit serves to link the primary selector wiper-side terminal trunk 102 to a bank-side terminal trunk 107 of a group of register secondary selectors RSS and, over back contacts of the switching relay, to a bankside terminal trunk 103 of a group of incoming secondary selectors ISS. During periods in which the switching relay is operated, the last-mentioned terminal trunk, instead of being linked to the primary selector wiper-side terminal trunk 102, is linked to the register secondary selector group bank-side terminal trunk 107. The incoming secondary selectors ISS and the intermediate selectors IS are associated in pairs, the wiper-side terminal trunk 104 of each incoming secondary selector ISS being connected by an interstage trunk 114 to the wiper-side terminal trunk 112 of the associated intermediate selector IS. The wiper-side terminal trunk 106 of each outgoing secondary selector OSS is connected to the outlet of a supervisory link circuit SLC the inlet of which is connected to a bank-side terminal trunk 111 of a group of intermediate selectors IS. This link circuit serves to control and supervise a call set up over the outgoing secondary selector, and includes apparatus for this purpose. Each register tertiary selector RTS is individual to a register RG and has its wiper-side terminal trunk 110 connected to this register. The wiper-side terminal trunk 108 of each register secondary selector RSS is connected by an interstage trunk 115 to a bank-side terminal trunk 109 of a group of register tertiary selectors RTS. All the registers RG are served by the single common marker MK.

The general operation of the selecting arrangements as regards the setting up of a call between two lines connected to the exchange is briefly as follows. The assumption of the calling condition by a line causes a forward-marking condition to exist on a forward-marking wire of the primary selector group bank-side terminal trunk 101 pertaining to the line. In response to this forward-marking condition, the common control circuit of the group of primary selectors PS concerned brings about the application of a forward-marking condition to a forward-marking wire of the wiper-side terminal trunk 102 of each free primary selector of this group. In the incoming link circuit ILC individual to each primary selector affected, the forward-marking condition is extended through to a forward-marking wire of the register secondary selector group bank-side terminal trunk 107 associated with this link circuit. In response to this extension of the forward-marking condition, the common control circuit of the group of register secondary selectors RSS concerned brings about the application of a forward-marking condition to a forward-marking wire of the wiper-side terminal trunk 108 of each free register secondary selector of this group. As regards each register secondary selector wiper-side terminal trunk 108 affected, the forward-marking condition is extended over the relevant interstage trunk 115 to a forward-marking wire of the register tertiary selector group bank-side terminal trunk 109 associated with the register secondary selector wiper-side terminal trunk. In response to this extension of the forward-marking condition, the common control circuit of the group of register tertiary selectors RTS concerned brings about the application of a forward-marking condition to a forward-marking wire of the wiper-side terminal trunk 110 of each free register tertiary selector of this group, and hence to a forward-marking wire in the free register RG connected to each such wiper-side terminal trunk. The result of this forward-marking process is that the forward-marking condition is extended to every free register having access to the line circuit of the calling line. The allotter previously referred to as being common to all the registers operates to the end that only one register RG responds to the receipt of a forward-marking condition at a time. The register RG which responds applies a setting-initiating condition for a brief period to an incoming setting wire included in section 116 of the wiper-side terminal trunk 110 of the register tertiary selector RTS individual to this register. This application of a setting-initiating condition causes the common control circuit of the group of register tertiary selectors RTS concerned to effect the selection of a forward-marked bank-side terminal trunk 109 of the group and to bring about the application of a setting-initiating condition for a brief period to an incoming setting wire included in section 118 of the selected bank-side terminal trunk, this setting-initiating condition being extended over the relevant inter-stage trunk 115 to a setting wire included in section 120 of the register secondary selector wiper-side terminal trunk 108 with which this selected bank-side terminal trunk is associated. In response to this extension of the setting-initiating condition, the common control circuit of the group of register secondary selectors RSS concerned effects the selection of a forward-marked bank-side terminal trunk 107 of the group and brings about the application of a setting-initiating condition for a brief period to an incoming setting wire included in section 122 of the selected bank-side terminal trunk, this setting-initiating condition being extended over the relevant incoming link circuit ILC to a setting wire of the primary selector wiper-side terminal trunk 102 with which this selected bank-side terminal trunk is associated. In response to this extension of the setting-initiating condition, the common control circuit of the group of primary selectors PS concerned effects the selection of the forward-marked bank-side terminal trunk 101 of the group, with the result that all the forward-marking conditions applied in respect of the calling line connected to this trunk are removed. Each common control circuit which in respect of the call has responded to a setting-initiating condition as just described in effect records, by means of electronic storage circuits included in a master selector circuit, over which particular wiper-side terminal trunk of the group of selectors concerned the setting-initiating condition is received in respect of the call (or, in other words, which particular selector of the group is to be set under the control of the master selector circuit), and which particular bank-side terminal trunk is selected as the one to which the wiper-side terminal trunk concerned is to be connected by the selector. When set each master selector circuit affected proceeds to bring about the setting of the relevant selector of the group concerned to effect a through connection between the wiper-side terminal trunk of the selector and the selected bank-side terminal trunk. A register tertiary selector RTS, a register secondary selector RSS, and a primary selector PS may therefore all be in process of being set in respect of the call at the same time. When all three such selectors have been set in respect of the call, the calling loop is extended through them to the register RG allotted to the call. The register then operates the switching relay in the incoming link circuit ILC concerned by applying a relay-operating condition to a link-control wire included in the wiper-side terminal trunk 110 of the register tertiary selector concerned, reverts dialling tone to the calling line over the line wires incoming to it and included in section 116 of the said trunk 110, and applies an engaging earth to the private wire incoming to it and included in the same section 110. This private wire is a through one extended to the line circuit LC of the calling line. Upon such application of an engaging earth, the master selector circuits which have been taken into use for the call become free for attending to other calls. Upon receiving the dialled digits signifying the called line, the register RG concerned acquires the use of the marker MK as soon as it becomes available and transfers to it the necessary information enabling it to apply a backward-marking condition to a backward-marking wire of the primary selector group bank-side terminal trunk 101 associated with the called line. In response to this backward-marking condition, the common control circuit of the group of primary selectors PS to which this bankside terminal trunk belongs brings about the application of a backward-marking condition to a backward-marking wire of the wiper-side terminal trunk 102 of each free primary selector of this group. As regards each primary selector wiper-side terminal trunk 102 affected, the backward-marking condition is extended over the relevant inter-stage trunk 113 to a backward-marking wire of the outgoing secondary selector bank-side terminal trunk 105 associated with the primary selector wiper-side terminal trunk. In response to this extension of the backward-marking condition, the common control circuit of the group of outgoing secondary selectors OSS concerned brings about the application of a backward-marking condition to a backward-marking wire of the wiper-side terminal trunk 106 of each free outgoing secondary selector of this group. In the supervisory link circuit SLC individual to each outgoing secondary selector affected, the backward-marking condition is extended through to a backward-marking wire of the intermediate selector group bank-side terminal trunk 111 associated with this link circuit. In response to this extension of the backward-marking condition, the common control circuit of the group of intermediate selectors IS concerned brings about the application of a backward-marking condition to a backward-marking wire of the wiper-side terminal trunk 112 of each free intermediate selector of this group. As regards each intermediate selector wiper-side terminal trunk 112 affected, the backward-marking condition is extended over the relevant inter-stage trunk 114 to a backward-marking wire of the wiper-side terminal trunk 104 of the incoming secondary selector ISS associated with the particular intermediate selector. The result of this backward-marking process is that the backward-marking condition is extended to every free incoming secondary selector having access to the called line. At the same time as the marker MK applies the backward-marking condition for a brief period in respect of the call, the register RG allotted to the call applies a setting-initiating condition to an outgoing setting wire for a brief period. This outgoing setting wire is extended, over the register tertiary selector RTS and register secondary selector RSS used on the call and through the incoming link circuit ILC used on the call, to a setting wire of the incoming secondary selector group bank-side terminal trunk 103 associated with this incoming link circuit. The appearance of the setting-initiating condition on the last-mentioned setting wire causes the common control circuit of the group of incoming secondary selectors concerned to effect the selection of a backward-marked wiper-side terminal trunk 104 of a selector of the group and to bring about the application of a setting-initiating condition for a brief period to a setting wire of the selected wiper-side terminal trunk, this setting-initiating condition being extended over the relevant inter-stage trunk 114 to a setting wire of the wiper-side terminal trunk 112 of the intermediate selector IS associated with the incoming secondary selector ISS concerned. In response to this extension of the setting-initiating condition, the common control circuit of the group of intermediate selectors IS concerned effects the selection of a backward-marked bank-side terminal trunk 111 of the group and brings about the application of a setting-initiating condition for a brief period to a setting wire of the selected bank-side terminal trunk, this setting-initiating condition being extended through the relevant supervisory link circuit SLC to a setting wire of the wiper-side terminal trunk 106 of the outgoing secondary selector OSS associated with this link circuit. In response to this extension of the setting-initiating condition, the common control circuit of the group of outgoing secondary selectors OSS concerned effects the selection of a backward-marked bank-side terminal trunk 105 of the group and brings about the application of a setting-initiating condition for a brief period to a setting wire of the selected bank-side terminal trunk, this setting-initiating condition being extended over the relevant inter-stage trunk 113 to a setting wire of the primary selector wiper-side terminal trunk 102 with which this selected bank-side terminal trunk is associated. In response to this extension of the setting-initiating condition, the common control circuit of the group of primary selectors PS concerned effects the selection of the backward-marked bank-side terminal trunk 101 of the group, which is the trunk associated with the called line. Each common control circuit which in respect of the call effects the selection of a backward-marked trunk as just described, in effect records, by means of electronic storage circuits included in a master selector circuit, over which particular terminal trunk the setting-initiating condition is received and which particular terminal trunk is selected. When set, each master selector circuit affected applies a master-selector-set condition for a brief period to a master-selector-set wire which is extended to the marker MK over a wire common to all the master selector circuits of the selecting stage concerned, and proceeds to bring about the setting of the relevant selector of the group concerned to effect a through connection between the wiper-side terminal trunk of the selector and the relevant bank-side terminal trunk. An incoming secondary selector ISS, an intermediate selector IS, an outgoing secondary selector OSS, and a primary selector PS may therefore all be in process of being set in respect of the call at the same time. As soon as the marker MK has received a master-selector-set condition on the master-selector-set wire for each selecting stage concerned, it is released and becomes free to attend to other calls. When an outgoing pair of line wires of the register RG concerned become connected through over section 117 of the relevant register tertiary selector wiper-side terminal trunk 110 and the relevant incoming secondary and intermediate selectors to the supervisory link circuit SLC concerned, this link circuit applies a holding earth to the private wire incoming to it and to the private wire outgoing from it, with the consequence that each master selector circuit concerned is freed for use on other calls as soon as it has performed its setting function and the relevant private wire has been extended to the selector set by it. The called line is rung from the supervisory link circuit SLC, which reverts ringing tone towards the register RG. The register RG responds to the receipt of ringing tone by releasing itself from the connection and releasing the switching relay of the incoming link circuit ILC used on the call. The line wires extending to the calling line thereupon become connected through in this incoming link circuit to the line wires of the relevant incoming secondary selector bank-side terminal trunk 103 and thence to the incoming side of the supervisory link circuit SLC. Further control and supervision of the call is thereafter vested in the supervisory link circuit.

In the case of a call to a P. B. X group of lines, the marker MK, instead of applying a backward-marking condition to a backward-marking wire associated with one line as just described, applies a backward-marking condition to the relevant backward-marking wires associated with all the lines of the group.

Referring now to Fig. 2, this shows the line circuit LC (Fig. 1) of a line connected to the exchange. This line circuit has through positive and negative line wires. The positive line wire 1 is directly connected on the exchange side (the right-hand side as shown) to a corresponding line wire of the primary selector group bank-side terminal trunk pertaining to the line, and is connected to earth over a first line resistor R1 and to a forward-marking wire 4 over a first control resistor R3. The negative line wire 2 is directly connected on the exchange side to a corresponding line wire of the primary selector group bank-side terminal trunk and is connected to negative battery (50 volts negative) over a second line resistor R2. On the line side (the left-hand side as shown), the positive line wire 1 and the negative line wire 2 are of course connected to the corresponding line wires of the line concerned. The line circuit has a private or "P" wire 3 which is directly connected to a private wire of the primary selector group bank-side terminal trunk, and which is connected to earth over a control rectifier U and meter SM in series, the rectifier being a dry-plate one connected to permit operation of the meter in response to a positive battery condition on the private wire. In addition to these connections, the private wire 3 is directly connected to a busy-marking wire 3A, and is connected to negative battery over the primary winding (I) of an impulse-generating transformer TR and a second control resistor R4 in series and to a source of "class of service" tone over a third control resistor R5, terminal CS being cross-connected to an appropriate source. The forward-marking wire 4 is directly connected to a forward-marking wire of the primary selector group bank-side terminal trunk, and is connected to the cathode of a cold-cathode gas-filled diode N through the secondary winding (II) of the impulse-generating transformer TR. The anode of this diode is connected to positive battery (50 volts positive). The busy-marking wire 3A is directly connected to a busy-marking wire of the primary selector group bank-side terminal trunk. When the line assumes the calling condition, the resulting current through the two line resistors R1 and R2 and the calling loop produces a voltage drop across the first line resistor R1 and thereby causes a forward-marking condition (10 or more volts negative) to exist on the forward-marking wire 4. When, as the result of this forward-marking condition, the line and private wires 1, 2, and 3 become connected through to a register, the register if necessary records the information given by the "class of service" tone extended to it over the through private wire and then applies a holding and busy-marking condition to this wire by earthing it. The busy-marking condition is extended to the busy-marking wire 3A and thereby renders the forward-marking condition on the forward-marking wire 4 ineffective. Subsequent to the disconnection of the register, the holding and busy-marking condition is maintained on the through private wire for the duration of the call by the supervisory link circuit used on the call. When the line is the called line of a connection, a forward-marking condition is caused to exist on the forward-marking wire 4 as soon as the line is looped in respect of the call, but is rendered ineffective in this case also by a busy-marking condition extended to the busy-marking wire 3A. In the case where, after the line assumes the calling condition, dialling is unduly delayed after the reversion of dialling tone from the register taken into use, the register after measuring off a delay period removes the earth holding and busy-marking condition from the through private wire. In response to the fall of current through its primary winding (I) which results from such removal of earth from the through private wire, the impulse-generating transformer TR produces in its secondary winding (II) a voltage impulse which serves to strike the cold-cathode gas-filled diode N. When thus started, the discharge through the diode N is sustained until the calling loop is opened, and gives a visible indication of the permanent loop condition of the line and serves to change the potential of the forward-marking wire 4 so that the forward-marking condition no longer exists on this wire. In this way, a permanent loop condition is prevented from holding selectors and a register out of use. In the case where the line is the calling line of a call and the called line clears first and clearing by the calling line is unduly delayed, the supervisory link circuit used on the call removes the earth holding and busy-marking condition from the through private wire after a delay period, causing the cold-cathode gas-filled diode N to strike with the results just set forth.

Referring now to Figs. 3A and 3B, these together show the individual circuit of a primary selector PS (Fig. 1) and the common control circuit of the group of primary selectors to which this selector belongs, and constitute a schematic circuit diagram of the so-called functional type. Each primary selector has two sets of positive line and negative line and private wipers, and has one marking wiper M. For simplicity, only one set of positive line and negative line and private wipers is shown in the circuit diagram, the private wiper of this set being the wiper designated P. The positive line and negative line and private wipers of the other set are connected to wires 64, 65, and 66 respectively. The individual circuit of each primary selector includes a wiper-choosing relay WS which by its condition determines, by means of its contacts ws2, ws3, and ws4, whether the line and private wipers of one or the other set are connected to the respective corresponding wires of the wiper-side terminal trunk of the selector. In addition to the positive and negative line wires 28 and 29 and the private or "P" wire 30, this trunk comprises a forward-marking or "FM" wire 31, a backward-marking or "BM" wire 27, and a setting or "S" wire 32. The last-mentioned wire is directly connected to the marking wiper M of the primary selector. The forward-marking wire 31 of the trunk is linked by a forward-marking gate I2 and a wire 130 with a group forward-marking wire 23 in the common control circuit, and the backward-marking wire 27 of the trunk is linked by a backward-marking gate I4 and a wire 131 with a group backward-marking wire 25 in the common control circuit. Each of the gates just mentioned is individual to the primary selector and is arranged to block the extension of the relevant marking condition from the relevant marking wire in the common control circuit during periods in which the private wire 30 of the wiper-side terminal trunk of the selector is earthed, and during periods in which any one of a number of master selector circuits included in the common control circuit is in process of setting up a call over the primary selector. Each of these master selector circuits has individual to it a coupling switch for coupling the master selector circuit to the individual circuit of any primary selector of the group in order to enable the primary selector to be set under the control of the master selector circuit. The coupling switches are high-speed motor-driven uniselectors similar to the primary and other selectors. For simplicity, only one of the master selector circuits and parts of another are represented in the circuit diagram, but the number actually provided may of course be considerably larger than two. Wipers CW1, CW2, CW3, CW4, and CW5 are the wipers of the coupling switch pertaining to the master selector circuit which is fully represented in the circuit diagram. Each bank-side terminal trunk of the group of primary selectors has allocated to it, for selection controlling purposes, an individual channel of a 200-channel time-division-multiplex system local to the common control circuit. This system comprises a plurality of pulse highways on which pulse trains (or, in one case, single pulses) pertaining to different channels appear from time to time as is requisite for selection controlling purposes, the pulses pertaining to a channel occupying time positions which recur periodically and are individual to the channel, and such time positions pertaining to the different channels being interlaced. The allocation of the channels to the bank-side terminal trunks is such that the channels, if taken in the cyclic order of occurrence of the respective time positions pertaining thereto in one complete cycle of such time positions, pertain respectively to the bank-side terminal trunks arranged in the cyclic order in which the wipers of a primary selector when rotated make contact with the respective sets of bank contacts associated with these trunks. The common control circuit includes a forward-marking multiplex MX1, a busy-marking multiplex MX3, and a backward-marking multiplex MX4. Each of these multiplexes has 200 input wires corresponding to the 200 channels of the 200-channel time-division-multiplex system, and hence corresponding to the 200 bank-side terminal trunks of the group of primary selectors. Each has an output pulse highway, and serves to produce on this highway, in response to the presence of the relevant condition on an input wire (forward-marking, busy-marking, or backward-marking, as the case may be), the pulse train pertaining to the channel, and bank-side terminal trunk, to which this input wire corresponds. The common control circuit includes a further multiplex, a setting multiplex MX2, which has 100 input wires 21 which are constituted by the 100 wires of the group bank multiple which are connected to the bank contacts associated with the marking wipers M of the primary selectors of the group. Each wire 21 thus corresponds to a pair of bank-side terminal trunks, one associated with one set of wipers of each primary selector of the group and the other associated with the other set of wipers of each such selector. The setting multiplex MX2 has an output pulse highway 20, and serves to produce on this highway, in response to the presence of a setting-initiating condition (earth) on an input wire, a pulse train pertaining to the pair of bank-side terminal trunks to which this input wire corresponds. Each channel of the 100-channel time-division-multiplex system constituted by the setting muliplex MX2 and its output pulse highway 20 corresponds to two adjacent channels of the 200-channel time-division-multiplex system, these two adjacent channels being of course the channels corresponding to the relevant pair of bank-side terminal trunks. A bank-side terminal trunk of the group of primary selectors, as well as including the positive and negative line wires 1 and 2 and the private or "P" wire 3, which are directly connected to the respective corresponding wires of the group bank multiple, also includes a forward-marking or "FM" wire 4, a busy-marking wire 3A, and a backward-marking or "BM" wire 10. The input wires, corresponding to a bank-side terminal trunk, of the forward-marking multiplex MX1, busy-marking multiplex MX3 and backward-marking multiplex MX4 are respectively constituted by the forward-marking wire, busy-marking wire, and backward-marking wire of the trunk. The common control circuit includes an electronic allotter A which serves to allot a free master selector circuit for use on a call. The allotter has an input wire 132 for each primary selector of the group, and has an allocation wire (38, 39) for each master selector circuit. The output pulse highway 5 of the forward-marking multiplex MX1 is connected to a main forward-marking pulse highway 6 over a pulse-controlled forward-marking gate I5 which is arranged to block the extension over it to the last-mentioned highway of the pulse train pertaining to any channel, and bank-side terminal trunk, in respect of which the busy-marking multiplex MX3 is producing the corresponding pulse train or in respect of which a master selector circuit is producing the corresponding pulse train. The gate I5 also serves to block the extension of any pulses from the pulse highway 5 to the pulse highway 6 during any period in which a master-selector-set condition is being applied to a primary selector master-selector-set wire 18 or in which pulses exist on a main backward-marking pulse highway 12. The output pulse highway 11 of the backward-marking multiplex MX4 is connected to the main backward-marking pulse highway 12 over a pulse-controlled backward-marking gate I6 which is arranged to block the extension over it to the last-mentioned highway of the pulse train pertaining to any channel, and bank-side terminal trunk, in respect of which the busy-marking multiplex MX3 is producing the corresponding pulse train or in respect of which the forward-marking multiplex MX1 or a master selector circuit is producing the corresponding pulse train. The main forward-marking pulse highway 6 and the main backward-marking pulse highway 12 are arranged to produce pulses, corresponding to any pulses on them, on a main combined-marking pulse highway 7 which is connected over a pulse-selection gate G1 to a selection pulse highway 8. The association of the pulse highways 6 and 12 with the pulse highway 7 is by way of a gate G5. The output pulse highway 20 of the setting multiplex MX2 has associated with it a setting pulse lengthener L2 having an output wire 19 which constitutes the control wire of the pulse-selection gate G1 and on which a gate-opening condition is produced whenever pulses exist on this output pulse highway. The main forward-marking pulse highway 6 has associated with it a forward-marking pulse lengthener L1 having an output wire 22 on which a forward-marking condition is produced whenever pulses exist on this highway, and which is connected over a group forward-marking gate I1 to the group forward-marking wire 23 previously referred to. The main backward-marking pulse highway 12 has associated with it a backward-marking pulse lengthener L3 having an output wire 24 on which a backward-marking condition is produced whenever pulses exist on this highway, and which is connected over a group backward-marking gate I3 to the group backward-marking wire 25 previously referred to. Each of the two group gates I1 and I3 just mentioned is arranged to block the extension of the relevant marking condition from the relevant pulse lengthener output wire during periods in which none of the master selector circuits of the common control circuit is free. Each master selector circuit includes two electronic storage circuits, a wiper-side storage circuit and a bank-side storage circuit. In the circuit diagram SS2 and DS2 represent respectively the wiper-side and bank-side storage circuits pertaining to the master selector circuit which is fully represented, whilst SS1 and DS1 represent the corresponding storage circuits pertaining to another master selector circuit. The wiper-side storage circuit of a master selector circuit serves to record, in respect of a call for which the master selector circuit is taken into use, over which particular primary selector wiper-side terminal trunk a setting-initiating condition has been received in respect of the call or, in other words, which particular primary selector of the group is to be set under the control of the master selector circuit in respect of the call. The bank-side storage circuit of a master selector circuit serves to record, in respect of a call for which the master selector circuit is taken into use, to which particular bank-side terminal trunk the wiper-side terminal trunk concerned is to be connected by the primary selector concerned. The wiper-side storage circuit (SS1, SS2) of each master selector circuit has an input wire (32A, 32B) individual to, and connected to the setting wire 32 of, the wiper-side terminal trunk of each primary selector of the group, and has a marking output wire (34, 35) corresponding to each input wire. It serves to produce, in response to the application of a setting-initiating condition to an input wire for a brief period, a steady marking condition on the corresponding marking output wire. Each marking output wire (34, 35) is connected to the particular bank contact which pertains to the individual circuit of the relevant primary selector in the bank of a marking wiper CW1 of the coupling switch of the master selector circuit, and is also connected so that the existence of the marking condition on it serves to bring each of the forward-marking and the backward-marking gates I2 and I4 of this individual circuit to the condition in which the extension of the relevant marking condition is blocked. Each marking output wire is associated with the relevant pair of gates I2 and I4 by way of a gate G6 which is individual to the primary selector concerned and which has an output wire 33. The wiper-side storage circuit (SS1, SS2) of each master selector circuit also serves to produce in response to the application of a setting-initiating condition (earth) to any input wire (32A, 32B) for a brief period, a steady setting condition (50 volts negative) on a setting output wire (36, 37) and the closing, unless or until a coupling switch test relay TA associated with the coupling switch of the master selector circuit is operated, of an energising circuit (over wire 41) for the latch electromagnet LMA of this coupling switch. The coupling switch test relay TA is operated over the marking wiper CW1 of the coupling switch when this wiper encounters the marking condition on a contact in its bank. The setting output wire (36, 37) of a wiper-side storage circuit is connected so that the existence of the steady setting condition on it serves to intimate to the electronic allotter A of the common control circuit that the particular master selector circuit concerned has been taken into use for a call, and serves to cause the bank-side storage circuit of this master selector circuit to perform its functions in respect of the call, and serves to exert the requisite influence pertaining to the particular master selector circuit in regard to the control of the group forward-marking gate I1 and the group backward-marking gate I3 of the common control circuit. The setting output wires (36, 37) of the wiper-side storage circuits of all the master selector circuits included in the common control circuit are associated with the gates I1 and I3 by way of a gate G2 having an output wire 26. The bank-side storage circuit (DS1, DS2) of each master selector circuit has an input circuit (8A, 8B) connected to the selection pulse highway 8, and has a marking output wire (21A, 21B) individual to each of the 100 pairs of bank-side terminal trunks. It serves to produce, in response to the first pulse present on the selection pulse highway 8 subsequent to the appearance of the setting condition on the setting output wire (36, 37) of the associated wiper-side storage circuit, an alternating current marking condition on the marking output wire corresponding to the pair of bank-side terminal trunks which includes the particular bank-side terminal trunk to which this pulse pertains. Each marking output wire (21A, 21B) is connected to the respective wire 21, corresponding to the relevant pair of bank-side terminal trunks, of the 100 wires of the group bank multiple which are connected to the bank contacts associated with the marking wipers M of the primary selectors of the group. The alternating current marking condition has a frequency which is different for each master selector circuit of the common control circuit. Frequencies of the order of 10 kilocycles are contemplated. The bank-side storage circuit (DS1, DS2) of each master selector circuit also serves to produce, in response to the first pulse present on the selection pulse highway 8 subsequent to the appearance of the setting condition on the setting output wire (36, 37) of the associated wiper-side storage circuit, a relay-operating condition on a single wiper-choosing output wire (40A, 40B) if the bank-side terminal trunk to which this impulse pertains is one such that operation of the wiper-choosing relay WS of the relevant primary selector individual circuit is required, a steady master-selector-set condition on a single master-selector-set output wire (16, 17), and the pulse train pertaining to the trunk on an output pulse highway (14, 15). The master-selector-set output wire of each bank-side storage circuit is connected, over a differentiating circuit element (BE1, BE2) individual to the storage circuit, and in common with the corresponding wires of all bank-side storage circuits of all primary selector common control circuits, to the primary selector master-selector-set wire 18. This wire is connected to the marker circuit. Each differentiating circuit element (BE1, BE2) as just referred to serves to produce a master-selector-set condition on wire 18 for a brief period at the beginning of a steady master-selector-set condition on the relevant output wire of the bank-side storage circuit with which the circuit element is associated. The output pulse highway (14, 15) of the bank-side storage circuit of each master selector circuit is connected so that a pulse train on it serves to exert the requisite control of the pulse-controlled forward-marking and backward-marking gates I5 and I6 previously mentioned. The output pulse highways (14, 15) of the bank-side storage circuits of all the master selector circuits included in the common control circuit are associated with the gates I5 and I6 by way of a gate G4 having an output pulse highway 13. Each master selector circuit includes a high-speed electromagnetic selector-setting test relay TB. This relay has a control circuit which in effect includes a band-pass filter BPF and an amplifier-detector AD, and which serves to operate the relay when the alternating current marking condition pertaining to the particular master selector circuit appears on the setting wire 32 of the primary selector circuit to which the master selector circuit is coupled by its coupling switch and therefore appears on wiper CW2 of this switch and on wire 51. The couplings between a master selector circuit and the individual circuit of a primary selector which the coupling switch of the master selector circuit provides, include one over wiper CW4 between the wiper-choosing output wire 40B of the bank-side storage circuit and the operating winding (I) of the wiper-choosing relay WS, and one over wiper CW3 over which the latch electromagnet LMB of the primary selector is energised if necessary over front contact ta1 of the coupling switch test relay TA and back contact tb1 of the selector-setting test relay TB. The couplings referred to also include one over wiper CW5 between a control wire 45 of a resetting circuit of the master selector circuit and the private wire 30 of the wiper-side terminal trunk concerned. This resetting circuit includes a gate G3 and is arranged so that the wiper-side storage circuit and therefore the remainder of the master selector circuit is restored to normal when the private wire of the wiper-side terminal trunk assumes the earth holding and busy-marking condition subsequent to the operation of the selector-setting test relay TB.

When the line associated with a bank-side terminal trunk of the group of primary selectors assumes the calling condition, thereby causing a forward-marking condition (10 or more volts negative) to exist on the forward-marking wire 4 of the trunk, the forward-marking multiplex MX1 of the common control circuit produces on its output pulse highway 5 the pulse train pertaining to the trunk. This train is extended, assuming that no condition exists to cause the pulse-controlled forward-marking gate I5 to block the extension of the train, to the main forward-marking pulse highway 6. The pulse train pertaining to the trunk consequently appears on the main combined-marking pulse highway 7, and the forward-marking pulse lengthener L1 produces a forward-marking condition (20 volts negative) on its output wire 22 (it may already be doing so as a consequence of one or more other pulse trains on the main forward-marking pulse highway 6). Assuming that at least one of the master selector circuits of the common control circuit is free, the forward-marking condition is extended through gate I1 to the group forward-marking wire 23 and thence to the forward-marking wire 31 of the wiper-side terminal trunk of each free primary selector of the group. When, as a consequence of the last-mentioned extension of the forward-marking condition, a setting-initiating condition (earth) is applied for a brief period to the setting wire 32 of a wiper-side terminal trunk of a primary selector of the group and is hence applied to the corresponding input wire 132 of the allotter A, causing a free master selector circuit to be allocated, the wiper-side and bank-side storage circuits of the allocated master selector circuit of the common control circuit are set during this brief period to record respectively over which particular wiper-side terminal trunk the setting-initiating condition has been received and to which particular bank-side terminal trunk this wiper-side terminal trunk is to be connected by the primary selector concerned. Assuming by way of example that the master selector circuit which is fully represented in the figure is the one concerned, the setting-initiating condition on the setting wire 32 of the wiper-side terminal trunk, extended to the relevant input wire 32B of the wiper-side storage circuit SS2, brings about the immediate setting of this storage circuit, and the consequent appearance of the steady setting condition (50 volts negative) on the setting output wire 37 of this storage circuit causes the bank-side storage circuit DS2 to be set by the first pulse present on the selection pulse highway 8 subsequent to this appearance of the steady setting condition. The first pulse present as just referred to is present by reason of the fact that the appearance of the setting-initiating condition (earth) on the setting wire 32 of the wiper-side terminal trunk brings about the opening of the pulse-selection gate G1 of the common control circuit. The opening of the pulse-selection gate G1 results from the fact that the setting-initiating condition, extended to an input wire 21 of the setting multiplex MX2 over the marking wiper M of the primary selector, causes this multiplex to produce on its output pulse highway 20 the pulse train pertaining to the pair of bank-side terminal trunks to which this input wire corresponds. This pulse train causes the setting pulse lengthener L2 to produce the gate-opening condition on its output wire 19 and thereby causes the pulse-selection gate G1 to be opened. Thus the pulse train which causes the pulse-selection gate G1 to be opened pertains to the pair of bank-side terminal trunks associated with the position in which the wipers of the primary selector happen to be standing when the setting-initiating condition appears on the wiper-side terminal trunk of this selector. It follows by reason of the method of allocation of the channels of the 100-channel and 200-channel time-division-multiplex systems that the first pulse present on the selection pulse highway 8 subsequent to the appearance of the steady setting condition on the setting output wire 37 of the wiper-side storage circuit SS2 is a pulse, if two or more pulse trains exist on the main combined-marking pulse highway 7 at the time, of that one of these two or more trains which pertains to that one of the two or more corresponding bank-side terminal trunks which is associated with that one of the two or more corresponding wiper positions which is reached first by the primary selector wipers when these are driven from the position in which they happen to be standing. As a consequence of the setting of the wiper-side and bank-side storage circuits, the coupling switch of the master selector circuit is driven if necessary (as a result of the energisation of its latch electromagnet LMA in a circuit over wire 41 and back contacts ta1) to couple the master selector circuit to the individual circuit of the primary selector concerned, and the coupling switch test relay TA is operated in a circuit over wiper CW1 and wire 35. Thereupon the primary selector is driven if necessary and its wiper-choosing relay WS operated if necessary to connect its wiper-side terminal trunk through to the bank-side terminal trunk to which the pulse which has set the bank-side storage circuit pertains, the selector-setting test relay TB of the master selector circuit being operated, in response to the alternating current marking condition applied to the wire 21 concerned, when the primary selector wipers occupy the relevant position. The driving of the primary selector if necessary (as just referred to) results from the energisation of its latch electromagnet LMB in a circuit over front contact ta1, back contact tb1, and wiper CW3. The operation of relay WS if necessary (as just referred to) results from the energisation of its winding (I) in a circuit over wire 40B and wiper CW4. As soon as the through private wire is earthed at the register concerned, relay WS if operated is locked up on its holding winding (II) in a circuit over contacts ws1, and the resetting circuit of the master selector circuit brings about the restoration to normal of the wiper-side storage circuit SS2 and the consequent restoration to normal of the remainder of the master selector circuit. In the resetting circuit referred to, the presence of earth on wires 45 and 46 at the same time causes gate G3 to apply a resetting condition (earth) to a resetting wire 44 of the storage circuit SS2.

When the line associated with a bank-side terminal trunk of the group of primary selectors is the called line of a call, and the marker applies the backward-marking condition (20 volts negative) to the backward-marking wire 10 of the trunk, the backward-marking multiplex MX4 of the common control circuit produces on its output pulse highway 11 the pulse train pertaining to the trunk. This train is extended, assuming that no condition exists to cause the pulse-controlled backward-marking gate I6 to block the extension of the train, to the main backward-marking pulse highway 12. The pulse train pertaining to the trunk consequently appears on the main combined-marking pulse highway 7, and the backward-marking pulse lengthener L3 produces the backward-marking condition on its output wire 24. Assuming that at least one of the master selector circuits of the common control circuit is free, the backward-marking condition is extended through gate I3 to the group backward-marking wire 25 and thence to the backward-marking wire 27 of the wiper-side terminal trunk of each free primary selector of the group. When as a consequence of the last-mentioned extension of the backward-marking condition, a setting-initiating condition (earth) is applied for a brief period to the setting wire 32 of a wiper-side terminal trunk of a primary selector of the group, the ensuing operations correspond to those previously described which take place when such application of a setting-initiating condition takes place as a consequence of the extension of the forward-marking condition. In this case, however, only one pulse train, that corresponding to the backward-marked bank-side terminal trunk, can exist on the main combined-marking pulse highway 7 when the setting-initiating condition is applied as just referred to, assuming that the call is for an individual line and not for a group.

Figure 4:
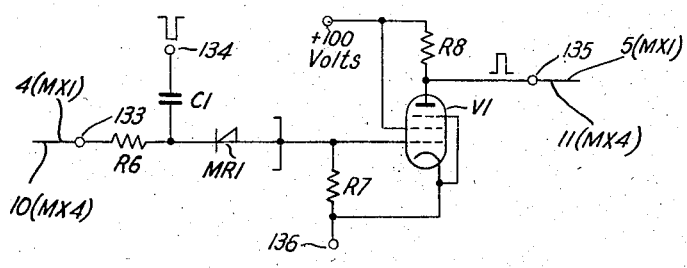

Referring now to Fig. 4, this shows the form which each of the multiplexes MX1 and MX4 in Fig. 3A may take. In this form of multiplex, for each input wire there is an input gate circuit comprising an input terminal 133, a pulse supply terminal 134, an input resistor R6, a pulse supply capacitor C1, and a gating rectifier MR1. The pulse supply terminal 134 is connected to a source of negative pulses which occupy the time positions pertaining to the relevant channel of the 200-channel time-division-multiplex system. All the input gate circuits are associated with a common load resistor R7, one end of which is connected to a bias supply terminal 136. The multiplex also includes an amplifying valve V1 having a load resistor R8 with which is associated an output terminal 135. In the case of the multiplex MX1 (Fig. 3A), the input terminals 133 are connected to the respective forward-marking wires 4, the bias supply terminal 136 is connected to 10 volts negative, and the output terminal 135 is connected to the output pulse highway 5. In the case of the multiplex MX4 (Fig. 3A), the input terminals 133 are connected to the respective backward-marking wires 10, the bias supply terminal 136 is connected to 20 volts negative, and the output terminal 135 is connected to the output pulse highway 11. In either case, in the absence of the relevant marking condition (10 or more volts negative or 20 volts negative) on the input terminal 133 of an input gate circuit this terminal is at earth potential and the gating rectifier MR1 of the gate circuit is biased so that it does not conduct in response to the negative pulses (which are of less than 10 volts amplitude) applied to the pulse supply terminal 134 of the gate circuit. When the relevant marking condition appears on the input terminal 133, the gating rectifier MR1 is no longer biased as just stated, with the result that pulses corresponding to those applied to the pulse supply terminal 134 appear across the common load resistor R7. The effect of this is that pulses pertaining to each channel (of the 200-channel time-division-multiplex system) in respect of which the relevant marking condition is applied appear across the common load resistor R7. These pulses are amplified by the amplifying valve V1, which produces corresponding positive pulses at the output terminal 135.

Figure 5:
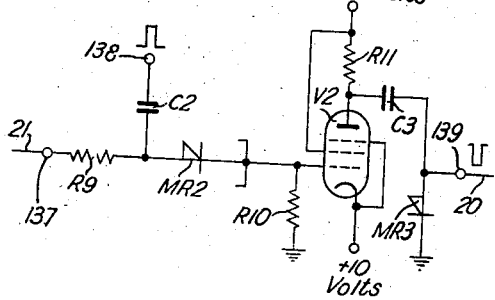

Referring now to Fig. 5, this shows the form which the multiplex MX2 in Fig. 3A may take. This form is not widely different from that of Fig. 4. For each input wire there is an input gate circuit comprising an input terminal 137, a pulse supply terminal 138, an input resistor R9, a pulse supply capacitor C2, and a gating rectifier MR2. The pulse supply terminal 138 is connected to a source of positive pulses which occupy the time positions pertaining to the relevant channel of the 100-channel time-division-multiplex system concerned. The pulses fed to the multiplex MX2 are wider than those fed to the other multiplexes, in order to cause each such pulse to coincide with the corresponding pair of pulses of the corresponding pair of channels of the 200-channel time-division-multiplex system. The multiplex includes a load resistor R10, an amplifying valve V2, a load resistor R11, an output capacitor C3, an output rectifier MR3, and an output terminal 139. The input terminals 137 are connected to the respective wires 21 of the group bank multiple and the output terminal 139 is connected to the output pulse highway 20. Normally, the input terminal 137 of an input gate circuit is at a potential of 50 volts negative and the gating rectifier MR2 is biased so that it does not conduct in response to the positive pulses applied to the pulse supply terminal 138. When the setting-initiating condition (earth) appears on the input terminal 137, the gating rectifier MR2 is no longer so biased, and pulses corresponding to those applied to the pulse supply terminal 138 appear across the common load resistor R10 associated with all the input gate circuits of the multiplex. These pulses are amplified by the amplifying valve V2, which produces corresponding negative pulses at its anode and hence at the output terminal 139. The output rectifier MR3 prevents the potential of terminal 139 from rising above earth at the end of each negative pulse applied to the output pulse highway 20.

Figure 6:
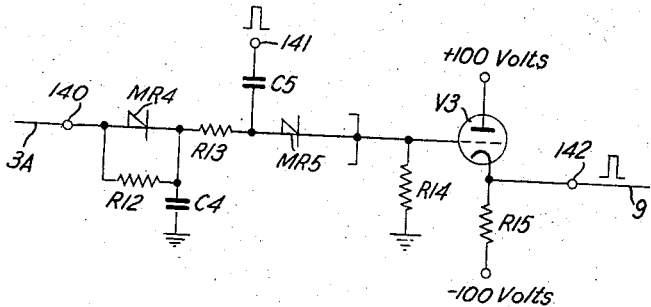

Referring now to Fig. 6, this shows the form which the multiplex MX3 in Fig. 3A may take. For each input wire there is an input gate circuit comprising an input terminal 140, a pulse supply terminal 141, a delay resistor R12, an input resistor R13, a delay capacitor C4, a pulse supply capacitor C5, a first gating rectifier MR4, and a second gating rectifier MR5. The pulse supply terminal is connected to a source of positive pulses which occupy the time positions pertaining to the relevant channel of the 200-channel time-division-multiplex system. All the input gate circuits are associated with a common load resistor R14. The multiplex includes an amplifying valve V3 having a load resistor R15 connected in the cathode circuit and having its cathode connected to an output terminal 142. The input terminals 140 are connected to the respective busy-marking wires 3A and the output terminal 142 is connected to the output pulse highway 9. Normally, the input terminal 140 of an input gate circuit is at a potential of 50 volts negative and the gating rectifiers MR4 and MR5 are biased so that MR5 does not conduct in response to the positive pulses applied to the pulse supply terminal 141. When the earth busy-marking condition appears on the input terminal 140, the second gating rectifier MR5 is no longer so biased, and pulses corresponding to those applied to the pulse supply terminal 141 appear across the common load resistor R14. The effect of this is that pulses pertaining to each channel (of the 200-channel time-division-multi-plex system) in respect of which a busy-marking condition is applied appear across R14. These pulses are amplified by the amplifying valve V3, which produces corresponding positive pulses at the output terminal 142. When the earth busy-marking condition is removed from the input terminal 140 of an input gate circuit, the multiplex continues to produce the pulses pertaining to the relevant channel at the output terminal 142 for a short time. This is because the delay circuit constituted by the delay resistor R12, the delay capacitor C4, and the first gating rectifier MR4 of the gate circuit delays the appearance of the normal 50 volts negative condition at the junction between the input resistor R13 and the second gating rectifier MR5.

Figure 7:
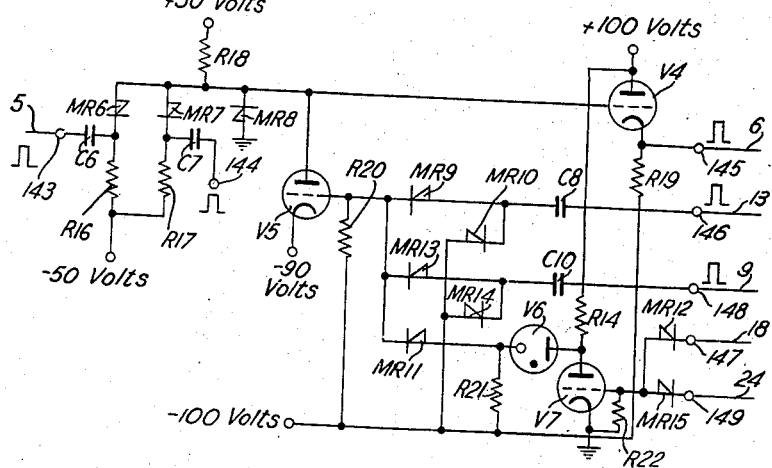

Referring now to Fig. 7, this shows the form which the gate I5 in Fig. 3A may take. In this form of gate, there is an input gate circuit which is of the so-called coincidence type and which comprises an input terminal 143, a first input capacitor C6, a pulse supply terminal 144, a second input capacitor C7, control resistors R16 and R17 and R18, and gating rectifiers MR6 and MR7 and MR8. The pulse supply terminal 144 is connected to a source of positive reference pulses one of which occurs in each time position pertaining to each channel of the 200-channel time-division-multiplex system. These pulses, currently termed "clock" pulses, are narrower than the pulses produced by the multiplexes and master selector circuits. The gate I5 also includes a triode V4 which serves as an output valve. This valve has a load resistor R19 connected in its cathode circuit, and has its cathode connected to an output terminal 145. Further, the gate I5 includes a further triode V5 which serves as an inhibiting valve. The grid circuit of the triode V5 includes a grid resistor R20 associated with a plurality of inhibiting input circuits. A first inhibiting input circuit comprises an inhibiting input terminal 146, a capacitor C8, and rectifiers MR9 and MR10, and a second inhibiting input circuit comprises an inhibiting input terminal 148, a capacitor C10, and rectifiers MR13 and MR14. A third inhibiting input circuit has individual to it an inhibiting input terminal 147 and a rectfier MR12, and a fourth inhibiting input circuit has individual to it an inhibiting input terminal 149 and a rectifier MR15. The third and fourth inhibiting input circuits have common to them a triode V7 and a cold cathode gas-filled diode V6, with which are associated three resistors R14, R22, and R21. The input terminal 143 is connected to the output pulse highway 5 of the forward-marking multiplex MX1, and the output terminal 145 is connected to the main forward-marking pulse highway 6. The inhibiting input terminals 146, 147, 148, and 149 are respectively connected to the output pulse highway 13 of the gate G4, the master-selector-set wire 18, the output pulse highway 9 of the busy-marking multiplex MX3, and the output wire 24 of the backward-marking pulse lengthener L3. In the absence of both a positive pulse at the input terminal 143 and a positive clock pulse at the terminal 144, the gating rectifier MR8 is conducting with the result that the grid of the valve V4 is held at earth potential. If a positive pulse appears at one of the terminals 143 and 144 but not at the other, the gating rectifier MR8 remains conducting and the grid of the valve V4 continues to be held at earth potential. Provided that no inhibiting condition appears at one or more of the inhibiting input terminals 146, 147, 148, and 149 at the time, the appearance together of a positive pulse at the input terminal 143 and a positive clock pulse at the pulse supply terminal 144 gives rise to a condition in which all three of the gating rectifiers MR6, MR7, and MR8 are biased so that they do not conduct, with the result that the potential of the grid of the valve V4 rises and a positive pulse is produced at the output terminal 145. When a pulse appears at one of the inhibiting input terminals 146, 147, and 148, the relevant inhibiting input circuit produces a voltage across the grid resistor R20 of the inhibiting valve V5 which causes this valve, normally biased to the anode current cut-off condition, to take an anode current which exceeds the current in the control resistor R18 and thereby prevents the gating rectifier MR8 from being biased to the non-conducting condition. Thus a pulse appearing at the input terminal 143 at the same time as a pulse appears at one of the terminals 146, 147, and 148 produces no corresponding pulse at the output terminal 145. Since the input gate circuit of the coincidence type can only produce a pulse coincident with a clock pulse, it follows that even if a pulse appearing at the input terminal 143 is slightly wider than a corresponding pulse applied to one of the terminals 146, 147 and 148, no incorrect production of a pulse at the output terminal 145 results provided that the said corresponding pulse completely overlaps the pertinent clock pulse. The triode V7 normally passes anode current and the diode V6 is normally non-conducting. When a negative pulse on the master-selector-set wire 18 is applied to the inhibiting input terminal 147, or a 20 volts negative marking condition on the output wire 24 of the backward-marking pulse lengthener L3 is applied to the inhibiting input terminal 149, the triode V7 is biased to the anode current cut-off condition with the result that the potential of its anode rises. As a consequence of this the diode V6 fires, the resulting voltage across the resistor R21 being applied over the rectifier MR11 to produce a voltage across the grid resistor R20 of the inhibiting valve V5 to bring about the requisite inhibiting action.

The gate I6 in Fig. 3A may take the form just described with reference to Fig. 7, except that in this case no fourth inhibiting circuit is required. In this case, of course, the input terminal 143 of Fig. 7 would be connected to the output pulse highway 11 of the backward-marking multiplex MX4, and the output terminal 145 would be connected to the main backward-marking pulse highway 12. The inhibiting input terminals 146, 147, and 148 would be respectively connected to the output pulse highway 13 of the gate G4, the output pulse highway 5 of the forward-marking multiplex MX1, and the output pulse highway 9 of the busy-marking multiplex MX3.

Figure 8:
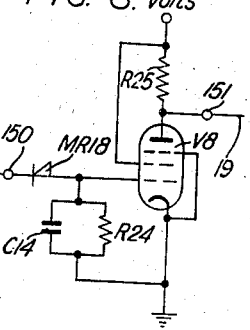

Referring now to Fig. 8, this shows the form which the pulse lengthener L2 in Fig. 3A may take. In this form, there is an input circuit comprising an input terminal 150, an input rectifier MR18, a delay capacitor C14, and a leak resistor R24. The pulse lengthener also includes a pentode V8 having a load resistor R25 with which is associated an output terminal 151. The input terminal 150 is connected to the output pulse highway 20 of the multiplex MX2, and the output terminal 151 is connected to the wire 19, which constitutes the control wire of the pulse-selection gate G1. The valve V8 is normally conducting, its control grid being at the same potential (earth) as its cathode. When a negative pulse produced by the multiplex MX2 appears at the input terminal 150, the delay capacitor C14 is rapidly charged through the input rectifier MR18, and the valve V8 is biased to the anode current cut-off condition. On the termination of the pulse, the potential of the terminal 150 reverts to earth, so that the rectifier MR18 is biased to the non-conducting condition. Between successive pulses of a train produced by the multiplex MX2, the charge on the delay capacitor slowly leaks away through the leak resistor R24, but the charge on the capacitor remains sufficient to keep the valve V8 biased to the anode current cut-off condition. Thus whilst the multiplex MX2 is producing a train of pulses the output terminal 151 is at 100 volts positive, but is otherwise at a much lower positive potential.

Referring now to Fig. 9, this shows the form which each of the pulse lengtheners L1 and L3 in Fig. 3A may take. In this form, there is an input circuit which comprises an input terminal 152, an input rectifier MR19, a delay capacitor C15, and a leak resistor R26, and which corresponds to the input circuit of Fig. 8 except that, being arranged to receive positive pulses, the input rectifier is connected the other way round. The pulse lengthener also includes a pentode V9 and a triode V10 which are resistance coupled by means of resistors R27, R28, and R29. The valve V10 has a load resistor R30 connected in the cathode circuit and has its cathode connected to an output terminal 153. The rectifiers MR20 and MR21 together limit the variation of the potential of the output terminal 153 to the range earth to 20 volts negative. In the case of the pulse lengthener L1 (Fig. 3A), the input terminal 152 is connected to the main forward-marking pulse highway 6, and the output terminal 153 is connected to the wire 22, which constitutes the input wire of the group forward-marking gate I1. In the case of the pulse lengthener L3 (Fig. 3A), the input terminal 152 is connected to the main backward-marking pulse highway 12, and the output terminal 153 is connected to the wire 24, which constitutes the input wire of the group backward-marking gate I3 and which also constitutes an inhibiting input wire of the gate I5. The valve V9 is normally biased to the anode current cut-off condition, so that the valve V10 passes sufficient anode current to cause the output terminal 153 to be held at earth potential. When a positive pulse appears at the input terminal 152, the valve V9 is rendered conducting and remains so between successive impulses of a train. Whilst the valve V9 is conducting, the anode current of the valve V10 is consequently reduced, with the result that the potential of the output terminal 153 becomes 20 volts negative, which is the requisite marking condition.

Referring now to Fig. 10, this shows the form which the gate G5 in Fig. 3A may take. In this form there are two input circuits, one comprising an input terminal 154 and an input rectifier MR22, and the other comprising an input terminal 155 and an input rectifier MR23. Both these input circuits are connected to a load resistor R31 with which is associated an output terminal 156. The input terminal 154 is connected to the main forward-marking pulse highway 6, the input terminal 155 is connected to the main backward-marking pulse highway 12, and the output terminal 156 is connected to the main combined-marking pulse highway 7. On the appearance of a positive pulse at either or both of the input terminals 154 and 155, the pulse is transmitted to the output terminal 156. On the appearance of a positive pulse at either of the input terminals, its transmission to the other input terminal is prevented by the input rectifier associated with the last-mentioned terminal.

Referring now to Fig. 11, this shows the form which the gate G1 in Fig. 3A may take. In this form there are two input circuits, a pulse input circuit comprising an input terminal 157 and a control input circuit comprising an input terminal 158 and an input resistor R33 and a grid resistor R34. The pulse input circuit is associated with the control grid of a pentode V11, and the control input circuit is associated with the suppressor grid of this valve. The valve V11 is coupled to a triode V12 by an anode load resistor R32, a capacitor C16, and a rectifier MR24. The valve V12 has a load resistor R35 connected in the cathode circuit and has its cathode connected to an output terminal 159. The input terminal 157 is connected to the main combined-marking pulse highway 7, the input terminal 158 is connected to the control wire 19, and the output terminal 159 is connected to the selection pulse highway 8. The valve V11 is normally biased to the anode current cut-off condition both by virtue of the potential of its control grid and of the potential of the suppressor grid. When a positive pulse appears at the input terminal 157 at a time when the input terminal 158 is more positive than normal (i. e. is made 100 volts positive by the action of the pulse lengthener L2), the valve V11 passes anode current with the result that the anode current of the valve V12 is reduced to produce a negative pulse at the output terminal 159.

Referring now to Fig. 12, this shows the form which each of the gates I1 and I3 in Fig. 3B may take. This form consists simply of a rectifier MR25 associated with a marking input terminal 160, an output treminal 161, and an inhibiting input terminal 162. In the case of the gate I1, the marking input terminal 160 is connected to the wire 22, and the output terminal 162 is connected to the wire 23. In the case of the gate I3, the terminal 160 is connected to the wire 24, and the terminal 161 is connected to the wire 25. In either case the inhibiting input terminal 162 is connected to the wire 26. The wire 26 is normally at a potential of 50 volts negative, and in these circumstances a marking condition (20 volts negative) can be produced at the input terminal 160 and be transmitted to the output terminal 161. When an inhibiting condition (earth) is applied to the wire 26 by the gate G2, when an attempt is made by the relevant pulse lengthener to produce a marking condition at the input terminal 160, the rectifier MR25 conducts and thereby prevents the production of the marking condition.

Referring now to Fig. 13, this shows the form which each of the gates I2 and I4 in Fig. 3B may take. This form consists simply of two gating rectifiers MR26 and MR27 and a resistor R37 associated with a marking input terminal 163, an output terminal 164, and two inhibiting input terminals 165 and 166. In the case of the gate I2, the marking input terminal 163 is connected to the wire 130, and the output terminal 164 is connected to the wire 31. In the case of the gate I4, the marking input terminal 163 is connected to the wire 131, and the output terminal 164 is connected to the wire 27. In either case the inhibiting input terminals 165 and 166 are connected to the wires 33 and 30 respectively. Normally, the wire 33 is at a potential of 100 volts negative and the wire 30 is at a potential of 50 volts negative, and in these circumstances a marking condition (20 volts negative) can be transmitted from the input terminal 163 to the output terminal 164. When an inhibiting condition (earth) is applied to either of the wires 33 and 30, the connection over the relevant rectifier (MR26, MR27) serves to prevent the output terminal 164 from going negative.

Referring now to Fig. 14, this shows the form which the gate G6 in Fig. 3B may take. In this form there is an input circuit for each master selector included in the common control circuit. Each input circuit comprises an input terminal 167 and an input rectifier MR28. All the input circuits are connected to an output circuit comprising a resistor R36 and an output terminal 168 which is connected to wire 33. The application of an earth condition to any input terminal causes the output terminal 168 to assume in effect the same (earth) inhibiting condition.

Referring now to Fig. 15, this shows the form which the electronic allotter A in Fig. 3B may take. In this form of allotter, for each primary selector of the group there is an input circuit comprising an input terminal 169 and an input rectifier MR31. All these input circuits are connected through a common resistor R39 to the grid of a first section (hereinafter called the right-hand section) of a double-triode valve V13. The input terminals 169 of these input circuits are connected to the respective wires 132 connected to the respective setting wires 32 of the primary selectors of the group. For each master selector circuit included in the common control circuit, there is an allocation circuit comprising a control circuit terminal 170, an allocation circuit terminal 171, and a cold cathode gas-filled triode V14 which has a trigger resistor R42 and a cathode resistor R41. All the cold cathode gas-filled triodes V14 have a common anode load resistor R43. The control circuit terminals 170 of these allocation circuits are connected to the respective setting output wires (36, 37) of the master selector circuits, and the allocation circuit terminals 171 are connected to the respective allocation wires (38, 39) associated with the master selector circuits. The junction between the anodes of the triodes V14 and the common load resistor R43 is connected to the anode of the second section (hereinafter called the left-hand section) of the double-triode valve V13. The two sections of the valve V13 have a common cathode load resistor R40. In the absence of a setting-initiating condition (earth) on any of the input terminals 169, all these terminals have a potential of 50 volts negative, with the result that (since the grid of the left-hand section of the valve V13 has a potential of 25 volts negative) anode current flows in the left-hand section of the valve V13 but not in the right-hand section. Whilst a master selector circuit is free, the corresponding setting output wire (36, 37) and therefore the corresponding control circuit terminal 170 has a potential of about 50 volts positive, with the result that a discharge takes place between the trigger electrode and the cathode of the corresponding triode V14. So long as anode current flows in the left-hand section of the valve V13, such a discharge between the trigger electrode and the cathode of a triode V14 does not cause this triode to fire so far as the main gap between the anode and cathode is concerned. This is because the flow of anode current in the left-hand section of the valve V13 produces a substantial voltage drop across the resistor R43 and thereby lowers the potential of the anodes of the triodes V14. Whilst a master selector circuit is busy, the corresponding setting output wire (36, 37) and therefore the corresponding control circuit terminal 170 has a potential of 50 volts negative, with the result that no discharge takes place between the trigger electrode and the cathode of the corresponding triode V14. When the setting-initiating condition appears on one of the input terminals 169, the resulting change of potential of the grid of the right-hand section of the valve V13 causes anode current to flow in this section and to cease to flow in the left-hand section. Consequently, the potential of the anodes of the triodes V14 rises until the main gap of one of these triodes associated with a free master selector circuit i. e. one in which there is a discharge between the trigger electrode and the cathode fires and brings about a substantial voltage drop across the resistor R43. Upon such firing, the resulting voltage drop across the relevant cathode resistor R41 brings about a change in the potential of the allocation circuit terminal 171 associated with the particular triode V14 concerned, thereby allocating for use the master selector circuit to which this terminal is connected. Upon the termination of the setting-initiating condition, the double-triode valve V13 reverts to its normal condition and the particular triode V14 referred to is extinguished. The allotter is then ready to allocate another master selector circuit in response to the appearance of the setting-initiating condition on an input terminal.

Referring now to Fig. 16, this shows the form which each of the wiper-side storage circuits (SS1, SS2) of Fig. 3B may take. In this form of storage circuit, there is an electromagnetic relay MM which serves for closing a point in the circuit of the latch electromagnet LMA of the coupling switch of the master selector circuit concerned. The recording by the storage circuit of the identity of a wiper-side terminal trunk is effected by electronic storage equipment, and is in no way affected by the operating lag of the relay MM or dependent upon the coupling of the master selector circuit to a primary selector. For each primary selector of the group (i. e. for each wiper-side terminal trunk concerned), there is a storage unit comprising an input terminal 174, an input resistor R60, an input rectifier MR32, a cold cathode gas-filled triode V18, a trigger electrode circuit resistor R52, a cathode circuit rectifier MR33, a cathode circuit resistor R53, and a marking output terminal 175. The input terminals 174 of these storage units are connected to the respective input wires such as 32A and 32B, and the marking output terminals 175 are connected to the respective marking output wires such as 34 and 35. In addition to the storage units and the relay MM already referred to, the storage circuit includes three cold cathode gas-filled triodes V15, V16, and V19, two triodes V17 and V20, various resistors and capacitors which will shortly be referred to, an allocation circuit terminal 172, a setting output terminal 173, a latch electromagnet control circuit terminal 176, and a resetting circuit terminal 177. The allocation circuit terminal 172 is connected to the allocation wire (38, 39) associated with the master selector circuit concerned, the setting output terminal 173 is connected to the setting output wire (36, 37) associated with this master selector circuit, the latch electromagnet control circuit terminal 176 is connected to the wire 41 associated with this master selector circuit, and the resetting circuit terminal 177 is connected to the wire 44 associated with this master selector circuit. The cold cathode gas-filled triodes V15 and V16 have a common anode circuit load resistor R46, and each has an individual cathode circuit resistor (R49, R50) shunted by a capacitor (C18, C19). The arrangement is such that anode current flows in one or the other of these two triodes, the firing of the one in which anode current is not flowing serving to extinguish the flow of anode current in the other. Normally, anode current is flowing in the triode V16 and not in the triode V15. When the master selector circuit concerned is allocated for use by the allotter, the potential of the allocation circuit terminal 172 changes from 50 volts negative to a positive value, with the result that the coupling circuit constituted by the capacitor C17 and the resistors R44 and R45 produces a positive pulse on the trigger electrode of the triode V15 so that this triode is fired and the triode V16 is extinguished. The potential of the setting output terminal 173 connected to the cathode of the triode V16, and hence the potential of the corresponding setting output wire (36, 37), consequently changes from about 50 volts positive to 50 volts negative. The corresponding consequential change of the cathode of the triode V15 is from 50 volts negative to about 50 volts positive, and this change, applied to the grid of the triode V17, produces a considerable increase in the anode current of the triode V17. The triode V17 has a resistor R56 connected in its cathode circuit, and when the anode current is increased as just mentioned the potential of the cathode of V17 becomes sufficiently positive to enable an effective high tension supply for the triodes V18 and V19 to be derived from between the cathode of V17 and 100 volts negative. Decoupling capacitors C21 and C22 are associated with this high tension supply circuit. The cathode of the triode V17 is coupled to the grid of the triode V20 by the resistor R54, the winding of relay MM, and the resistors R57 and R58, and the appearance of the positive potential at the cathode of the triode V17 causes the potential of the cathode of the triode V20 to rise, by reason of an increased flow of current through the cathode circuit resistor R59, to at least earth. As soon as all the changes just outlined have taken place, the triode V18 of the storage unit associated with the particular wiper-side terminal trunk concerned is fired, owing to the potential of its trigger electrode rising to at least earth by reason of the existence of the setting-initiating condition on the relevant input terminal 174 in conjunction with the rise of potential of the cathode of the triode V20. All the triodes V18 of the wiper-side storage circuit have a common anode circuit resistor R51, and have their cathode circuit resistors R53 connected to 100 volts negative through the primary winding (I) of an impulse-producing transformer TRP. When the relevant triode V18 fires as just mentioned, the potential of its cathode rises to earth but is prevented from becoming positive by the effect of the rectifier MR33. The marking output terminal 175 is thus in effect earthed to provide the requisite marking condition on the marking output wire (34, 35) concerned. Upon the commencement of the flow of anode current through the triode V18, a voltage impulse is produced in the secondary winding (II) of the impulse-producing transformer TRP and serves to fire the triode V19, being applied in the requisite sense to the trigger electrode of the triode V19 through a resistor R55. As a consequence of the firing of the triode V19 the potential of its anode falls, and this causes the grid potential, and therefore the anode current, of the triode V20 to fall. This fall in the anode current of the triode V20 causes the potential of the cathode of this valve to become about 50 volts negative. As long as the potential of the cathode of the triode V20 remains at this value, the striking of a further triode V18 in response to an applied setting-initiating condition is prevented, since the input rectifiers MR32 of the storage units prevent the potentials of the trigger electrodes of the respective triodes V18 from becoming more positive than the cathode of the triode V20. The firing of the triode V19 brings about the operation of the relay MM, with the result that the latch electromagnet control circuit terminal 176, connected to wire 41, is connected to 50 volts negative battery. When the master selector circuit concerned has performed its functions in respect of the call for which it has been taken into use the potential of the resetting circuit terminal 177 is changed (as the result of the earthing of the private wire of the primary selector wiper-side terminal trunk concerned) from 50 volts negative to earth. The coupling circuit constituted by the capacitor C20 and the resistors R47 and R48 thereupon produces a positive pulse on the trigger electrode of the triode V16 so that this triode is fired and the triode V15 is extinguished. The potential of the cathode of the triode V17 again becomes negative, causing the whole wiper-side storage circuit to revert to its normal condition.

Referring now to Fig. 17, this shows the form which the gate G2 in Fig. 3B may take. In this form of gate, for each master selector circuit included in the common control circuit there is an input circuit comprising an input terminal 178 and an input rectifier MR34. All these input circuits are connected to the junction between two resistors R61 and R62 which are connected in series between the grid of a triode V21 and 100 volts negative. The input terminals 178 of these input circuits are connected to the respective setting output wires (36, 37). The gate has an output terminal 179 which is connected to the wire 26. Normally, the circuit over a rectifier MR35 and a resistor R66 connected in the cathode circuit of a triode V22 holds the potential of the output terminal 179 at 50 volts negative. As long as at least one of the master selector circuits is free, the potential of at least one of the setting output wires (36, 37) is about 50 volts positive, so that current flows from this wire (by way of the relevant input terminal 178) through the relevant input rectifier MR34 and the resistor R62 and holds the junction between the resistors R61 and R62 at about 50 volts positive. In these circumstances, anode current flows in the triode V21 and the anode current of the triode V22 has a minimum value, the two triodes being coupled by three resistors R63, R64, and R65. When the condition arises that none of the master selector circuits is free, the potential of each input terminal 178 is 50 volts negative, so that the grid of the triode V21 assumes a potential of 50 volts negative. As a result of this, the triode V21 is brought to the anode current cut-off condition and the anode current of the triode V22 is changed to a maximum value. The increased anode current flowing through the cathode circuit resistor R66 causes the potential of the cathode of the triode V22, and therefore of the output terminal 179, to change from 50 volts negative to earth, the rectifier MR36 serving to prevent the potential of the terminal 179 from becoming positive with respect to earth.

Referring now to Fig. 18, this shows the form which each of the bank-side storage circuits (DS1, DS2) in Fig. 3B may take. In this form of storage circuit, there is an electromagnetic relay W which serves for closing an operating circuit from the wiper-choosing relay (WS) of a primary selector when necessary. The recording by the storage circuit of the identity of a bank-side terminal trunk is effected by electronic storage equipment, and is in no way affected by the operating lag of the relay W. For each bank-side terminal trunk of the group of primary selectors, there is a storage unit including an input gate, an input pulse lengthener, a cold cathode gas-filled valve V25, a marking output gate, and a pulse output gate. Each input gate comprises gating rectifiers MR37, MR38, and MR39, resistors R70 and R71, a capacitor C23, and a pulse supply terminal 186. The pulse supply terminal 186 is connected to a source of negative pulses which occupy the time positions pertaining to the relevant channel of the 200-channel time-division-multiplex system. All the input gates are associated with a common pulse input terminal 181 which is connected to the input pulse highway (8A, 8B) of the bank-side storage circuit. Each input pulse lengthener comprises a capacitor C24 and a rectifier MR40. Each valve V25 has its trigger electrode connected to the associated pulse lengthener over a resistor R72, and is of a kind having an auxiliary gap, a circuit being provided over two resistors R74 and R75 for maintaining a continuous discharge between the electrodes of the auxiliary gap whereby the valve is enabled to operate from the charge available from the pulse lengthener capacitor C24. Each valve V25 has a resistor R79 and a capacitor C26 in its cathode circuit. Each marking output gate comprises a gating rectifier MR43, a resistor R81, a capacitor C28, and an alternating current supply terminal 189. The alternating current supply terminal 189 is connected to a source of alternating current of a frequency which is different for each master selector circuit of the common control circuit. It will be remembered that the bank-side terminal trunks are associated in pairs, a pair comprising the trunks associated with the same wiper position of a primary selector. The two marking output gates associated with a pair of bank-side terminal trunks are connected to a common marking output circuit which comprises a resistor R82, a capacitor C25, and a marking output terminal 184 which is connected to the relevant marking output wire (21A, 21B). Each pulse output gate comprises a gating rectifier MR44, a resistor R80, a capacitor C27, and a pulse supply terminal 188. The pulse supply terminal 188 is connected to a source of positive pulses which occupy the time positions pertaining to the relevant channel of the 200-channel time-division-multiplex system. All the pulse output gates are associated with a common pulse output terminal 182 by way of a triode V28 which has a load resistance R84 in its cathode circuit and is connected to serve as an amplifier of the so-called cathode-follower type. The pulse output terminal 182 is connected externally to the output pulse highway (14, 15) of the bank-side storage circuit, and is connected internally to a wiper-choosing control circuit including a wiper-choosing gate, a wiper-choosing pulse lengthener, a cold cathode gas-filled valve V27, and the relay W. The wiper-choosing gate comprises gating rectifiers MR45, MR47, and MR48, resistors R85, R86, and R87, a capacitor C31, and a pulse supply terminal 187. The pulse supply terminal 187 is connected to a source of positive pulses which occupy the time positions pertaining to alternate channels of the 200-channel time-division-multiplex system, these alternate channels being the ones associated with bank-side terminal trunks in respect of which the wiper-choosing relay (WS) of a primary selector has to be operated. The wiper-choosing pulse lengthener comprises a capacitor C32 and a rectifier MR46. The valve V27 is of the same kind as the valve V25, a circuit for maintaining the continuous auxiliary discharge being provided over two resistors R89 and R90. Its trigger electrode is connected to the wiper-choosing pulse lengthener over a resistor R88 and its anode circuit includes a decoupling resistor R91 and a decoupling capacitor C29. In addition to the terminals already referred to, the bank-side storage circuit includes a master-selector-set output terminal 183 which is connected to the master-selector-set output wire (16, 17), a wiper-choosing control circuit terminal 185 which is connected to the wiper-choosing output wire (40A, 40B), and a setting circuit terminal 180 which is connected to the setting output wire (36, 37) of the associated wiper-side storage circuit. Internally, the terminal 180 is connected to the control grid of a pentode V23 over a grid resistor R67. The pentode has an anode circuit load resistance R68 by which it is coupled to a triode V24. Normally, the potential of the setting circuit terminal 180 is about 50 volts positive. When the wiper-side storage circuit of the master selector circuit produces the steady setting condition on the setting output wire (36, 37), the potential of the terminal 180 becomes 50 volts negative, with the result that the pentode V23 is brought to the anode current cut-off condition and a considerable increase occurs in the anode current of the triode V24. The triode V24 has a resistor R69 connected in its cathode circuit, and when the anode current is increased as just mentioned the potential of the cathode of V24 becomes sufficiently positive to enable an effective high tension supply for the valves V25 and the valve V27 to be derived from between the cathode of V24 and earth. At the same time as an effective high tension supply for the valves V25 and the valve V27 is thus furnished, a coupling constituted by three resistors R73, R76, and R77 causes the anode current of a triode V26 to be increased to a value at which its cathode (and therefore the terminal 183) assumes a potential of 100 volts positive, being held at this potential by the voltage drop across a cathode circuit resistor R78 and the connection over a rectifier MR41. The first negative pulse received at the terminal 181 over the input pulse highway (8A, 8B) after the changes just mentioned causes the gating rectifier MR39 in the corresponding storage unit to be biased to the non-conducting condition and the charge on the condenser C24 to be increased by current flow through the rectifier MR40. The storage unit concerned is of course the one in which a negative pulse is applied to the terminal 186 coincidentally with the said first negative pulse received at the terminal 181. At the end of the said first negative pulse the valve V25 of the storage unit concerned fires by reason of the charge on the capacitor C24. This firing of one of the valves V25 renders it impossible for a further valve V25 to strike for the time being, this result being not only directly due to the fact that such firing lowers the anode potential of all the valves V25 but also being due to the fact that this lowering of the anode potential affects the triode V26 and causes the cathode of this triode and the terminal 183 to assume earth potential (at which they are held by the connection over a rectifier MR42). Upon the firing of the valve V25 of the storage unit concerned, its cathode potential rises by reason of the voltage drop across the cathode resistor R79, the rise being sufficient to open the marking output gate and the pulse output gate of the storage unit, the gating rectifiers MR43 and MR44 of which are normally biased to the non-conducting condition. Thus the relevant marking output terminal 184 is effectively connected to the alternating current source appropriate to the master selector circuit, and positive pulses which occupy the time positions pertaining to the relevant channel of the 200-channel time-division-multiplex system are applied to the pulse output terminal 182, the pulse output from the pulse output gate being amplified by the triode V28. If the bank-side terminal trunk concerned is one in respect of which the wiper-choosing relay (WS) of a primary selector has to be operated, the pulses applied to the pulse output terminal 182 coincide with the pulses applied to the terminal 187, so that during the period of coincidence of two such pulses the gating rectifier MR47 of the wiper-choosing gate is biased to the non-conducting condition and the charge on the condenser C32 is increased by current flow through the rectifier MR46. Upon such increase of the charge on the condenser C32, the valve V27 fires with the result that relay W is operated and at its contact w1 connects earth to the wiper-choosing control circuit terminal 185. When the steady setting condition on the terminal 180 is removed in the associated wiper-side storage circuit, the potential of the cathode of the triode V24 reverts to its normal value and an effective high tension supply no longer exists for the valves V25 and V27 and the bank-side storage circuit is restored to its normal condition.

Referring now to Fig. 19, this shows the form which each of the differentiating circuit elements (BE1, BE2) in Fig. 3A may take. This form consists simply of a condenser C33 and a resistor R92 together with an input terminal 190 and an output terminal 191. The input terminal 190 is connected to the relevant master-selector-set output wire (16, 17), and the output terminal 191 is connected to the primary selector master-selector-set wire 18. When the potential of the relevant master-selector-set output wire (16, 17) changes from 100 volts positive to become earth, the resulting discharge of the capacitor C33 through the resistor R92 produces a brief negative pulse at the output terminal 191.

Referring now to Fig. 20, this shows the form which the gate G4 in Fig. 3A may take. In this form there is an input circuit for each master selector circuit included in the common control circuit. Each input circuit comprises an input terminal 192 and an input rectifier MR49. All the input circuits are connected to a load resistor R93 with which is associated an output terminal 193. The input terminal 192 of an input circuit is connected to the output pulse highway (14, 15) of the bank-side storage circuit of the relevant master selector circuit, and the output terminal 193 is connected to the output pulse highway 13. On the appearance of a positive pulse at any of the input terminals 192, the pulse is transmitted to the output terminal 193, but its transmission to any other input terminal at which a corresponding pulse does not appear is prevented by the input rectifier associated with the last-mentioned terminal.

Referring now to Fig. 21, this shows the form which may be taken by the control circuit, represented by the band-pass filter BPF and the amplifier-detector AD in the functional schematic circuit diagram of Fig. 3B, of the high-speed electromagnetic selector-setting test relay TB of a master selector circuit. This form of control circuit has an input terminal 194 which is connected to the wire 51 of the master selector circuit concerned. It comprises a two-stage tuned alternating current amplifier, a detector circuit, and a direct current amplifier which directly controls the relay TB. The two-stage alternating current amplifier comprises two pentodes V29 and V30, an input circuit consisting of a capacitor CA and a resistor R94, two tuned coupling circuits constituted by transformers TRA and TRB together with tuning capacitors C34, C35, and C36, and cathode circuit resistors R95 and R96. The resistors R95 and R96 provide both negative feedback and grid bias. The amplifier is tuned to amplify an input of the frequency pertaining to the master selector circuit concerned, but to produce no effective output in respect of an input of a frequency pertaining to any of the other master selector circuits included in the common control circuit. The detector circuit comprises a rectifier MR50, a capacitor C37, and a resistor R97. The direct current amplifier comprises a pentode V31 which is normally biased to the anode current cut-off condition. When the detector produces an effective ouput voltage across the resistor R97, current flows in the anode circuit of the pentode V31 and operates the relay TB.

Referring now to Fig. 22, this shows the form which the gate G3 in Fig. 3B may take. The form of gate concerned has two control circuit terminals 194 and 195 and an output terminal 196, and includes two gating rectifiers MR51 and MR52 and two resistors R98 and R99. The two control circuit terminals 194 and 195 are connected to the wires 45 and 46 respectively of the resetting circuit of the master selector circuit concerned, and the output terminal 196 is connected to the resetting wire 44 of this resetting circuit. Until the condition arises that both the terminals 194 and 195 are earthed, current flow through the resistor R99 to negative battery over one or the other of the rectifiers maintains the potential of the output terminal 196 at or near 50 volts negative. When the condition just mentioned does arise, the connections to earth over the two rectifiers MR51 and MR52 both in the conducting condition cause the potential of the output terminal 196 to become earth.

Referring now to Fig. 23, this shows in detail the form taken by an incoming link circuit ILC (Fig. 1). Wires 28, 29, 30, 31, and 32 are connected to the corresponding wires of the relevant primary selector wiper-side terminal trunk (Fig. 3B). Wires 31 and 32 pass straight through the incoming link circuit, being connected to corresponding wires of the relevant register secondary selector bank-side terminal trunk. Wires 28A, 29A, 30A, 60, 67, 68, 69, and 73 are connected to corresponding wires of the last-mentioned bank-side terminal trunk. Wires 70, 71, and 72 are connected to corresponding wires of the relevant incoming secondary selector bank-side terminal trunk. Wire 60 passes straight through the incoming link circuit, being connected to a corresponding wire of the last-mentioned bank-side terminal trunk. The switching relay H of the link circuit has three contacts h1, h2, and h3. The functions of the link circuit were described with reference to Fig. 1.

Referring now to Fig. 24, this shows the individual circuit of an intermediate selector IS (Fig. 1) and the common control circuit of the group of intermediate selectors to which this selector belongs, and is a schematic circuit diagram of the so-called functional type. Each intermediate selector has two sets of positive line and negative line and private wipers, but for simplicity only one set is shown in the circuit diagram, and the wiper-choosing relay and its contacts and the arrangements for its control are omitted. To avoid unnecessary detailed description, each element of Fig. 24 which corresponds to an element of Figs. 3A and 3B is given the same designation as the corresponding element of Figs. 3A and 3B with the addition of the suffix X. Both the common control circuit and the individual circuit of the selector are constituted on, and operate on, generally similar lines to the corresponding circuits of a group of primary selectors, except for the simplifications arising from the fact that no provision has to be made for responding to, or extending, a forward-marking condition. Another difference is that when the bank-side storage circuit (DS1X, DS2X) of a master selector circuit is set in response to the first pulse present on the selection pulse highway 8X subsequent to the appearance of the setting condition on the setting output wire (36X, 37X) of the associated wiper-side storage circuit, it instead of having to produce the pulse train pertaining to the relevant bank-side terminal trunk on an output pulse highway (14, 15, Fig. 3A) has to produce a setting-initiating condition on a setting output wire (54A, 54B) individual to the bank-side terminal trunk. The setting-initiating condition applied to the setting output wire is a steady condition, and is converted to a brief setting-initiating condition on the setting wire 53 of the trunk by a differentiating circuit element BS. The bank-side storage circuit (DS1X, DS2X) may be of a form similar to that of Fig. 18 with the arrangements for producing a pulse train on an output pulse highway omitted, the setting output wire (54A, 54B) corresponding to a bank-side terminal trunk being connected to the cathode of the valve V25 of the storage unit pertaining to that trunk. In this case, when the bank-side storage circuit (DS1X, DS2X) is set, the potential of the relevant setting output wire rises above earth by reason of the voltage drop across the cathode resistor R79 of the valve V25 which is fired. In response to this rise, the differentiating circuit element BS produces the setting-initiating condition (earth) for a brief period on the setting wire 53. The element BS may be of a form similar to that shown in Fig. 19 except that the resistor (R92) is connected to 50 volts negative instead of earth. The arrangements in a bank-side storage circuit (DS1X, DS2X) for controlling wiper choosing may comprise a relay corresponding to W in Fig. 18 this relay being controlled by a cold cathode gas-filled triode which is in turn controlled from the cathode circuits of alternate valves V25.

In the case of the groups of register secondary selectors, and the one or more groups of register tertiary selectors, the common control circuits are constituted on, and operate on, similar lines to the common control circuit of a group of intermediate selectors, except for the simplifications arising from the facts that such groups only have 100 bank-side terminal trunks per group and no provision has to be made for controlling a wiper-choosing relay in the individual circuit of a selector. The individual circuit of each register secondary selector or register tertiary selector is arranged so that the selector serves when set to provide through connections between on the one hand bank-side terminal trunk wires comprising an incoming set of line and private wires (corresponding to 28A, 29A, and 30A in Fig. 23), an outgoing set of line and private wires (corresponding to 67, 68, and 69 in Fig. 23), an outgoing setting wire, (corresponding to 60 in Fig. 23), and a link-control wire (corresponding to 73 in Fig. 23), and on the other hand the respective corresponding wires of a wiper-side terminal trunk.

Referring now to Fig. 25, this shows the individual circuit of an incoming secondary selector ISS (Fig. 1) and part of the common control circuit of the group to which this selector belongs, and is a schematic circuit diagram of the so-called functional type. Each element of Fig. 25 which corresponds to an element of Figs. 3A and 3B is given the same designation as the corresponding element of Figs. 3A and 3B with the addition of the suffix Y. The wiper-side terminal trunk of an incoming secondary selector, in addition to the positive and negative line wires 28Y and 29Y and the private wire 30Y, comprises a backward-marking wire 56 and a setting wire 53Y. The backward-marking wire 56 is connected through a backward-marking gate I4Y to an input wire 57, individual to the trunk, of a backward-marking multiplex MX4Y forming part of a time-division-multiplex system local to the common control circuit. Each incoming secondary selector of the group has allocated to it, for selection controlling purposes, an individual channel of this system. The backward-marking gate I4Y is individual to the incoming secondary selector and is arranged to block the extension of the backward-marking condition during periods in which the private wire 30Y of the trunk is earthed and during periods in which any one of a number of master selector circuits included in the common control circuit is in process of setting up a call over the incoming secondary selector. In response to the presence of the backward-marking condition on the input wire 57, the backward-marking multiplex MX4Y produces the pulse train pertaining to the trunk on a backward-marking pulse highway 58. A bank-side terminal trunk of the group of incoming secondary selectors, as well as including the positive and negative line wires 70 and 71 and the private wire 72, also includes a setting wire 60. Each master selector circuit includes two electronic storage circuits, a wiper-side storage circuit (YDS2) and a bank-side storage circuit (YSS2). The bank-side storage circuit (YSS2) serves to record in respect of a call for which the master selector circuit is taken into use, over which particular bank-side terminal trunk a setting-initiating condition has been received in respect of the call. The wiper-side storage circuit (YDS2) serves to record, in respect of a call for which the master selector circuit is taken into use, which particular incoming secondary selector of the group is to be set to connect its wiper-side terminal trunk to the bank-side terminal trunk concerned. The bank-side storage circuit (YSS2) of each master selector circuit has an input wire individual to, and connected to the setting wire 60 of, each bank-side terminal trunk of the group, and has a marking output wire 62 corresponding to each of the 100 pairs of bank-side terminal trunks. It serves to produce, in response to the application of a setting-initiating condition to an input wire for a brief period, an alternating current marking condition, of a frequency individual to the particular master selector circuit, on the corresponding marking output wire 62. Each marking output wire 62 is connected to the respective wire, corresponding to the relevant pair of bank-side terminal trunks, of the 100 wires of the group bank multiple which are connected to the bank contacts associated with the marking wipers MY of the incoming secondary selectors of the group. The bank-side storage circuit (YSS2) of each master selector circuit also serves to produce, in response to the application of a setting-initiating condition to an input wire for a brief period, a steady setting condition on a setting output wire (37Y) and a relay-operating condition if necessary on a wiper-choosing output wire 61. The setting output wire (37Y) of a bank-side storage circuit is connected so that the existence of the steady setting condition on it serves to intimate to an electronic allotter AY included in the common control circuit that the particular master selector circuit concerned has been taken into use for a call, and serves to cause the wiper-side storage circuit of this master selector circuit to perform its functions in respect of the call. The wiper-side storage circuit (YDS2) of each master selector circuit has an input circuit connected to the backward-marking pulse highway 58, and has a marking output wire (54Y) individual to each channel of the time-division-multiplex system. It serves to produce, in response to the first pulse present on the backward-marking pulse highway 58 subsequent to the appearance of the setting condition on the setting output wire (37Y) of the associated bank-side storage circuit, a steady marking condition on the corresponding marking output wire. Each marking output wire (54Y) is connected to the particular bank contact which pertains to the individual circuit of the relevant incoming secondary selector in the bank of a marking wiper of a coupling switch of the master selector circuit, and is also connected so that the existence of the marking condition on it serves to bring the backward-marking gate I4Y of this individual circuit to the blocking condition, and serves to produce a setting-initiating condition for a brief period on the setting wire 53Y of the wiper-side terminal trunk. The wiper-side storage circuit (YDS2) also serves to produce, in response to the first pulse present on the backward-marking pulse highway 58 subsequent to the appearance of the setting condition on the setting output wire (37Y) of the associated bank-side storage circuit, a master-selector-set condition for a brief period on a master-selector-set output wire 18Y connected, in common with the corresponding wires of all wiper-side storage circuits of all incoming secondary selector common control circuits, to an incoming secondary selector master-selector-set wire in the marker circuit, and further serves to produce the closing, dependent upon the coupling switch test relay TAY, of an energising circuit for the latch electromagnet LMAY of the coupling switch. Apart from the differences already mentioned, the connections to the coupling switch wipers and banks correspond to those which have been described with reference to the common control circuit of a group of primary selectors. The gate G6Y may be of a form similar to that shown in Fig. 14 except that the resistor (R36) is connected to 50 volts negative instead of 100 volts negative. The differentiating circuit element BSY may be of the form shown in Fig. 19.

Referring now to Fig. 26, this shows the form which each of the bank-side storage circuits (YSS2) in Fig. 25 may take. In this form of storage circuit, there is an electromagnetic relay WY which serves for closing an operating circuit for the wiper-choosing relay (WSY) of an incoming secondary selector when necessary. The recording by the storage circuit of the identity of a bank-side terminal trunk is effected by electronic storage equipment, and is in no way affected by the operating lag of the relay WY. For each bank-side terminal trunk of the group of incoming secondary selectors, there is a storage unit comprising an input terminal 205, an input resistor R131, an input rectifier MR60, a cold cathode gas-filled triode V40, a resistor R123, a cathode circuit resistor R124, a cathode circuit capacitor C45, and a marking output gate. The input terminals 205 of these storage units are connected to the respective input wires 60. Each marking output gate comprises a gating rectifier MR61, a resistor R132, a capacitor C47, and an alternating current supply terminal 209. The alternating current supply terminal 209 is connected to a source of alternating current of a frequency which is different for each master selector circuit of the common control circuit. The two marking output gates associated with a pair of bank-side terminal trunks are connected to a common marking output circuit which comprises resistors R133 and R134, a capacitor C48, and a marking output terminal 206 which is connected to the relevant marking output wire 62. In addition to the storage units and the relay WY already referred to, the storage circuit includes four cold cathode gas-filled triodes V37, V38, V41, and V44, two triodes V39 and V42, various resistors and capacitors, an allocation circuit terminal 203, a setting output terminal 204, a wiper-choosing control circuit terminal 207, and a resetting circuit terminal 208. The terminals 203, 204, 207, and 208 are connected to the relevant wires 39Y, 37Y, 61, and 44Y respectively. The cold cathode gas-filled triodes V37 and V38 have a common anode circuit load resistor R117, and each has an individual cathode circuit resistor (R120, R121) shunted by a capacitor (C42, C43). Normally, anode current is flowing in the triode V38 and not in the triode V37. When the master selector circuit concerned is allocated for use by the allotter, the potential of the allocation circuit terminal 203 changes from 50 volts negative to a positive value, with the result that the coupling circuit constituted by the capacitor C41 and the resistors R115 and R116 produces a positive pulse on the trigger electrode of the triode V37, so that this triode is fired and the triode V38 is extinguished. The potential of the setting output terminal consequently changes from about 50 volts positive to 50 volts negative. The corresponding consequential change of the cathode of the triode V37 is from 50 volts negative to about 50 volts positive, and produces a considerable increase in the anode current of the triode V39. The triode V39 has a resistor R127 connected in its cathode circuit, and when the anode current is increased as just mentioned the potential of the cathode of V39 becomes sufficiently positive to enable an effective high tension supply for the triodes V40, V41, and V44 to be derived from between the cathode of V39 and 100 volts negative. The capacitor C46 is a decoupling capacitor. The cathode of the triode V39 is coupled to the grid of the triode V42 by the resistors R139, R128, and R129, and the appearance of the positive potential at the cathode of the triode V39 causes the potential of the cathode of the triode V42 to rise, by reason of an increased flow of current through the cathode circuit resistor R130, to at least earth. As soon as all the changes just outlined have taken place, the triode V40 of the storage unit associated with the particularly bank-side terminal trunk concerned is fired, owing to the potential of its trigger electrode rising to at least earth by reason of the existence of the setting-initiating condition on the relevant input terminal 205 in conjunction with the rise of potential of the cathode of the triode V42. All the triodes V40 of the bank-side storage circuit have a common anode circuit resistor R122, and have their cathode circuit resistors R124 connected to 100 volts negative, either through the primary winding (I) of an impulse producing transformer TRE or through the primary winding (I) of an impulse-producing transformer TRD, the last-mentioned method of connection being employed when the bank-side terminal trunk concerned is one in respect of which the wiper-choosing relay in an incoming secondary selector has to be operated. When the relevant triode V40 fires as just mentioned, the potential of its cathode rises and opens the associated marking output gate, the gating rectifier MR61 of which is normally biased to the non-conducting condition. Thus the relevant marking output terminal 206 is effectively connected to the alternating current source appropriate to the master selector circuit. If the triode V40 concerned is one which has its cathode circuit completed through the primary winding (I) of the transformer TRD, then the voltage impulse produced in the secondary winding (II) of the transformer when this triode fires serves to fire the triode V41, being applied in the requisite sense to the trigger electrode of the triode V41 through a resistor R126. The firing of the triode V41 brings about the operation of the relay WY, with the result that the wiper-choosing control circuit terminal 207 is connected to earth. If the triode V40 concerned is one which has its cathode circuit completed through the primary winding (I) of the transformer TRE, then the triode V44 is fired instead of the triode V41. In either case the firing brings about, as the result of the connection over the rectifier MR62 or MR63, a lowering of the potential of the cathode of V42. When the master selector circuit concerned has performed its functions in respect of the call for which it has been taken into use, the potential of the resetting circuit terminal 208 is changed from 50 volts negative to earth. The coupling circuit constituted by the capacitor C44 and the resistors R118 and R119 thereupon produces a positive pulse on the trigger electrode of the triode V38 so that this triode is fired and the triode V37 is extinguished. The potential of the cathode of the triode V39 again becomes 100 volts negative, causing the whole bank-side storage circuit to revert to its normal condition.

Referring now to Fig. 27, this shows the form which each of the wiper-side storage circuits (YDS2) in Fig. 25 may take. In this form of storage circuit, there is an electromagnetic relay MMY which serves for closing a point in the circuit of the latch electromagnet LMAY of the coupling switch of the master selector circuit concerned. The recording by the storage circuit of the identity of a wiper-side terminal trunk is effected by electronic storage equipment, and is in no way affected by the operating lag of the relay MMY or dependent upon the coupling of the master selector circuit to an incoming secondary selector. For each incoming secondary selector of the group (i. e. for each wiper-side terminal trunk concerned), there is a storage unit including an input gate, an input pulse lengthener, and a cold cathode gas-filled valve V34. Each input gate comprises gating rectifiers MR53, MR54, and MR55, resistors R103 and R104, and a pulse supply terminal 202. The pulse supply terminal 202 is connected to a source of negative pulses which occupy the time positions pertaining to the relevant wiper-side terminal trunk. All the input gates are associated with a common pulse input terminal 198 which is connected to the input pulse highway (58) of the wiper-side storage circuit. Each input pulse lengthener comprises a capacitor C39 and a rectifier MR56. Each valve V34 has its trigger electrode connected to the associated pulse lengthener over a resistor R105, and is of a kind having an auxiliary gap, a circuit being provided over two resistors R107 and R108 for maintaining a continuous discharge between the electrodes of this gap. Each valve V34 has a resistor R112 in its cathode circuit, and has its cathode connected to a marking output terminal 200 which is connected to the relevant marking output wire (54Y). The cathode is connected to earth through a rectifier MR59. All the cathode resistors R112 are connected to 50 volts negative through the primary winding (I) of an impulse-producing transformer TRC. The secondary winding (II) of this transformer is connected to the trigger electrode of a cold cathode gas-filled triode V36 which serves to control the relay MMY. In addition to the terminals already referred to, the wiper-side storage circuit includes a latch electromagnet control circuit terminal 201 which is connected to the wire 59, and a master-selector-set output terminal 199 which is connected to wire 17Y, and a setting circuit terminal 197 which is connected to the setting output wire (37Y) of the associated bank-side storage circuit. Internally, the terminal 197 is connected to the control grid of a pentode V32 over a grid resistor R100. The pentode has an anode circuit load resistance R101 by which it is coupled to a triode V33. When the bank-side storage circuit of the master selector circuit produces the steady setting condition on the setting output wire (37Y), the potential of the terminal 197 changes from about 50 volts positive to 50 volts negative, with the result that the pentode V32 is brought to the anode current cut-off condition and a considerable increase occurs in the anode current of the triode V33. The triode V33 has a resistor R102 connected in its cathode circuit, and when the anode current is increased as just mentioned the potential of the cathode becomes sufficiently positive to enable an effective high tension supply for the valves V34 and the valve V36 to be derived from between the cathode of V33 and earth. At the same time, the coupling constituted by three resistors R106, R109, and R110 causes the anode current of a triode V35 to be increased to a value at which its cathode (and therefore the terminal 199) assumes a potential of 50 volts positive, being held at this potential by the voltage drop across a cathode circuit resistor R111 and the connection over a rectifier MR57. The first negative pulse received at the terminal 198 over the input pulse highway 58 after the changes just mentioned causes the gating rectifier MR55 in the corresponding storage unit to be biased to the non-conducting condition and the charge on the condenser C39 to be increased by current flow through the rectifier MR56. At the end of the said first negative pulse the valve V34 of the storage unit concerned fires by reason of the charge on the capacitor C39, and renders it impossible for a further valve V34 to strike for the time being, the anode potential of all the valves V34 being lowered and causing the cathode of the triode V35 and the terminal 199 to assume a potential of 50 volts negative (at which they are held by the connection over a rectifier MR58). Upon the firing of the valve V34 of the storage unit concerned, its cathode potential rises to earth by reason of the voltage drop across the cathode resistor R112, being held at this value by the connection over the rectifier MR59. The marking output terminal 200 is thus effectively earthed to provide the requisite marking condition on the marking output wire 54Y concerned. Upon the commencement of the flow of anode current through the triode V34, a voltage impulse is produced in the secondary winding (II) of the transformer TRC and serves to fire the triode V36 and thereby bring about the operation of the relay MMY. Upon operation, relay MMY at its contact mmy1 connects terminal 201 to 50 volts negative battery. When the steady setting condition on the terminal 197 is removed in the associated bank-side storage circuit, the potential of the cathode of the triode V33 reverts to its normal value and an effective high tension supply no longer exists for the valves V34 and the valve V36 and the wiper-side storage circuit is restored to its normal condition.

In the case of the groups of outgoing secondary selectors, both the common control circuits and the individual circuits of the selectors are constituted on, and operate on, similar lines to the corresponding circuits of a group of intermediate selectors.

Referring now to Fig. 28, this shows the form which may be taken by the supervisory link circuit SLC (Fig. 1) used on a call between two local subscribers. This link circuit provides the feeding bridge for the connection. The incoming positive and negative line wires (on the right of the figure) are normally connected to earth and negative battery respectively through line resistors R135 and R136, and when a calling loop at a register is extended to these wires the resulting voltage drop across the line resistor R136 serves to strike a cold-cathode gas-filled triode V43 and brings about the operation of a slow-acting release relay B. This relay on operation at contact b3 applies a holding earth to the incoming private wire (i. e. the "P" wire on the right of the figure), and at contact b4 applies a holding earth to the outgoing private wire, and at contacts b1 and b2 connects the two windings of a line relay L in place of the line resistances R135 and R136. The line relay L thereupon operates and at its contact l1 extinguishes the valve V43 and closes a holding circuit for relay B, and at its contacts l2 and l3 connects a source of ringing current to the outgoing line wires. The circuit in which the source of ringing current is connected to the outgoing line wires includes the windings of a back-bridge relay D, a hybrid coil HC having windings (I), (II), (III), (IV), and (V), and a resistor R137, the source of ringing current being connected to terminals 212 and 213 and being rendered effective so far as the particular link circuit is concerned by the closing of contact b5. Flow of ringing current through the subscriber's instrument, if an instrument is connected to the called line, produces a low-frequency alternating voltage across the resistor R137, and thereby causes a normally closed pair of gates G7 and G8 to be opened and ringing tone to be reverted to the register from a source connected to terminals 210 and 211. Each of the gates G7 and G8 may be constituted similarly to the marking output gates in Fig. 18 the biasing potential applied to the output side of the gating rectifier being suitably adjusted. The register responds to the receipt of ringing tone by releasing itself from the connection and releasing the switching relay of the incoming link circuit (ILC, Fig. 1) used on the call. The line relay L then depends for its operation upon the calling loop at the instrument of the calling subscriber of the call. If the called subscriber answers, the back-bridge relay D operates on direct current flowing over the loop at the called subscriber's instrument and brings about the operation in turn of metering and ring-tripping relays J and F, relay F being operated by the closing of contact j1. The metering relay J is released by the opening of contact f2 of the ring-tripping relay F, which locks up over contacts f1 and b6. During the slow release of relay J, positive battery is connected to the incoming private wire in a circuit over a resistor R138 and contacts j2, h2, and b3. If the called subscriber clears before the calling subscriber, to guard against failure of the calling subscriber to clear a circuit for operating a relay H is closed over a back contact d2 of the back-bridge relay and a front contact *f*3 of the ring-tripping relay. Relay H is of a kind having a long operating lag (e. g. a thermal relay). Upon operation, relay H at contact *h*1 brings about the release of the release relay B and at contacts *h*2 and *h*3 removes the holding earths from the private wires. The link circuit has "BM" and "S" wires 214 and 215.

In one contemplated modification of the common control circuit arrangements which have been described in detail, the common control circuit of a group of selectors includes a number of master selector circuits in which the necessary information for setting a corresponding number of selectors in respect of a corresponding number of calls can be in storage at the same time, as in the arrangements previously described, but it is arranged that only one master selector circuit is rendered effective at a time as regards the performance of its function of setting a particular selector to effect a particular connection between a wiper-side terminal trunk and a bank-side terminal trunk. Thus the use of alternating current marking conditions of different frequencies to distinguish between markings applied by different master selector circuits is not necessary, and all marking conditions furnished by a master selector circuit can be direct current ones and the same for all master selector circuits. In this modification, an additional allotter is provided in the common control circuit to determine the order in which the master selector circuits are rendered effective as regards the performance of their function of setting a selector after the requisite storage has taken place.

In another contemplated modification of the common control circuit arrangements which has been described in detail, it is arranged that master selector circuits are available in common to the common control circuits of a number of groups of selectors of the same rank. In this case each master selector circuit includes an auxiliary bank-side storage circuit which serves to record, in respect of a call for which the master selector circuit is taken into use, which particular group of bank-side terminal trunks is concerned. The main bank-side storage circuit brings about the setting of the wipers of the selector concerned to the relevant position by first bringing about the setting to a corresponding position of a marking switch included in the master selector circuit and then marking the relevant bank contact in the bank of the marking wiper of the selector over a wiper of the marking switch determined by the setting of the auxiliary bank-side storage circuit.

What is claimed is:

1. In an automatic exchange system, a group of single-motion electro-mechanical selectors having no home position, wiper-side terminal trunks of said group of selectors, bank-side terminal trunks of said group of selectors, a common control circuit for said group of selectors, means for extending a marking condition from a bank-side terminal trunk to each free wiper-side terminal trunk of said group of selectors, a plurality of master selector circuits, a time-division-multiplex system in said common control circuit having a channel individual to each bank-side terminal trunk of said group of selectors, a multi-channel pulse transmission circuit of said time-division-multiplex system, means in said common control circuit, responsive to the appearance of said marking condition on a free bank-side terminal trunk of said group of selectors, for producing a pulse train corresponding to this marked terminal trunk in said multichannel pulse transmission circuit, means in said common control circuit, responsive to the receipt of a setting-initiating condition over a wiper-side terminal trunk of said group of selectors to which said marking condition has been extended, for allotting a free one of said master selector circuits for use on a call, a bank-side electronic storage circuit in each said master selector circuit, a pulse-selection gate in said common control circuit for controlling the connection of said multichannel pulse transmission circuit to each said bank-side electronic storage circuit, means in said common control circuit, responsive to the receipt of said setting-initiating condition over a wiper-side terminal trunk of said group of selectors, for opening said pulse-selection gate at a time in the cycle of said time-division-multiplex determined by the existing position of the wipers of the selector to which the wiper-side terminal trunk pertains, means in each said master selector circuit for rendering said bank-side electronic storage circuit in the master selector circuit responsive to a pulse received by the storage circuit by way of said pulse-selection gate, and means in each said bank-side electronic storage circuit for applying a further marking to the bank-side terminal trunk corresponding to a pulse in said multi-channel pulse transmission circuit to which the storage circuit has responded.

2. In an automatic exchange system, a group of primary selectors, a common control circuit for said group of primary selectors, a plurality of master selector circuits, line-side terminal trunks pertaining to the line circuit side of said group of primary selectors, selector-side terminal trunks pertaining to the other side of said gorup of primary selectors, a forward-marking wire in each said line-side terminal trunk marked in response to the assumption of the calling condition by the line to which the terminal trunk is connected, a backward-marking wire in each said line-side terminal trunk marked by a marker when the line to which the terminal trunk is connected is called, a forward-marking wire in each said selector-side terminal trunk, a backward-marking wire in each said selector-side terminal trunk, means for extending a marking condition from the forward-marking wire of a said line-side terminal trunk to the forward-marking wire of each free selector-side terminal trunk of said group of primary selectors, means for extending a marking condition from the backward-marking wire of a said line-side terminal trunk to the backward-marking wire of each free selector-side terminal trunk of said group of primary selectors, means for inhibiting the extension of a marking condition from the forward-marking wire of any said line-side terminal trunk during a period in which the backward-marking wire of any said line-side terminal trunk is marked, means in said common control circuit, responsive to the receipt of a setting-initiating condition over a said selector-side terminal trunk to which a marking condition has been extended, for allotting a free one of said master selector circuits for use on a call, and electronic storage equipment in each of said master selector circuits for recording in respect of a call for which the master selector circuit has been taken into use the identity of the particular one of said selector-side terminal trunks over which a setting-initiating condition has been received and the identity of the particular marked one of said line-side terminal trunks to which this particular selector-side terminal trunk is to be connected by the relevant primary selector of said group.

3. In an automatic exchange system, a line circuit, two line wires in said line circuit, a private wire in said line circuit, a group of primary selectors, a common control circuit for said group of primary selectors, a line-side terminal trunk of said group of primary selectors individual to said line circuit, a forward-marking wire included in said line-side terminal trunk and extending to said line circuit and said common control circuit, a conductive connection between one said line wire and said forward-marking wire for bringing said forward-marking wire to a potential constituting a forward-marking condition in response to the looping of said line wires over a calling loop, means in said common control circuit, responsive to the appearance of said forward-marking condition on said forward-marking wire, for initiating the setting up of a connection forwards from said line circuit over an available path including a primary selector of said group, means for applying a holding and busy-marking condition to said private wire subsequent to such setting up of a connection forwards from said line circuit, and electronic means in said line circuit, responsive to the removal of said holding and busy-marking condition from said private wire, for holding the potential of said forward-marking wire at a value not constituting a forward-marking condition until such time as the calling loop across said line wires is opened.

4. In an automatic exchange system, a calling circuit, a called circuit marked by a marker, a plurality of ranks of selectors, a group of selectors in each of said ranks, an available path involving one selector in each said group for interconnecting said calling and called circuits for the setting up of a call, a common control circuit for each said group of selectors, means for extending the marking backwards from said called circuit to mark said available path in the common control circuit of each said group of selectors, bank-side terminal trunks pertaining to each said group of selectors, wiper-side terminal trunks pertaining to each said group of selectors, electronic means for each said group of selectors for recording the identities of the two terminal trunks, one a bank-side terminal trunk pertaining to the group and the other a wiper-side terminal trunk pertaining to the group, which are included in said marked available path, means for initiating the setting of each said electronic means to effect such recording, means for giving a signal to the marker as soon as each said electronic means has been set, means for rendering the terminal trunks concerned unavailable for use on other calls during the period in which their identities are recorded by a said electronic means, and means for and controlled by each said electronic means for controlling the setting of the relevant selector to effect a through connection between the particular terminal trunks the identities of which are recorded by the electronic means.

5. In an automatic exchange system, a marked calling circuit, a further circuit, a plurality of ranks of selectors, a group of selectors in each of said ranks, an available path involving one selector in each said group for interconnecting said calling circuit and said further circuit for the setting up of a call, a common control circuit for each said group of selectors, means for extending the marking forwards from said calling circuit to mark said available path in the common control circuit of each said group of selectors, bank-side terminal trunks pertaining to each said group of selectors, wiper-side terminal trunks pertaining to each said group of selectors, electronic means for each said group of selectors for recording the identities of the two terminal trunks, one a bank-side terminal trunk pertaining to the group and the other a wiper-side terminal trunk pertaining to the group, which are included in said marked available path, means for initiating the setting of each said electronic means to effect such recording, means for terminating the marking in respect of said calling circuit as soon as each said electronic means has been set, means for rendering the terminal trunks concerned unavailable for use on other calls during the period in which their identities are recorded by a said electronic means, and means for and controlled by each said electronic means for controlling the setting of the relevant selector to effect a through connection between the particular terminal trunks the identities of which are recorded by the electronic means.

6. In an automatic exchange system, a group of selectors, a common control circuit for said group of selectors, a plurality of master selector circuits, bank-side terminal trunks pertaining to said group of selectors, wiper-side terminal trunks pertaining to said group of selectors, means for extending a marking condition from a said bank-side terminal trunk to each free said wiper-side terminal trunk, means in said common control circuit, responsive to the receipt of a setting-initiating condition over a said wiper-side terminal trunk to which a marking condition has been so extended, for allotting a free one of said master selector circuits for use on a call, and electronic storage equipment in each of said master selector circuits for recording in respect of a call for which the master selector circuit has been taken into use the identity of the said wiper-side terminal trunk over which a setting-initiating condition has been received and the identity of the marked said bank-side terminal trunk to which this particular wiper-side terminal trunk is to be connected by the relevant selector of said group.

7. An automatic exchange system as claimed in claim 6 including a time-division-multiplex system in said common control circuit having a channel individual to each bank-side terminal trunk of said group of selectors, a multi-channel pulse transmission circuit of said time-division-multiplex system, means in said common control circuit, responsive to the appearance of a marking condition on a free said bank-side terminal trunk, for producing a pulse train corresponding to this marked terminal trunk in said multichannel pulse transmission circuit, an electronic storage circuit in each said master selector circuit, responsive to a pulse present in said multi-channel pulse transmission circuit subsequent to the taking into use of the master selector circuit, for recording the identity of the marked said bank-side terminal trunk to which this pulse corresponds, and means in each said electronic storage circuit for applying a further marking to a terminal trunk the identity of which is recorded by the storage circuit.

8. An automatic exchange system as claimed in claim 6 wherein the selectors constituting said group are selectors other than primary selectors, and said electronic storage equipment in each said master selector circuit includes means for extending the setting-initiating condition to a bank-side terminal trunk pertaining to said group in response to the setting of the electronic storage equipment to record the identity of this terminal trunk.

9. An automatic exchange system as claimed in claim 6 including means in each said master selector circuit, responsive to the appearance of a normal busying and holding condition on a terminal trunk the identity of which is recorded in the master selector circuit, for freeing the master selector circuit for further use.

10. An automatic exchange system as claimed in claim 6 including an electro-mechanical coupling switch in each said master selector circuit for coupling the master selector circuit to any selector of said group.

No references cited.